US009445119B2

(12) United States Patent
Sikora et al.

(10) Patent No.: US 9,445,119 B2
(45) Date of Patent: Sep. 13, 2016

(54) METHOD AND DEVICE FOR PROCESSING A VIDEO SEQUENCE

(75) Inventors: Thomas Sikora, Berlin (DE); Andreas Krutz, Berlin (DE); Alexander Glantz, Berlin (DE)

(73) Assignee: VESTEL ELEKTRONIK SANAYI VE TICARET A.S., Manisa (TR)

( * ) Notice: Subject to any disclaimer, the term of this patent is extended or adjusted under 35 U.S.C. 154(b) by 1171 days.

(21) Appl. No.: 13/504,730

(22) PCT Filed: Oct. 28, 2010

(86) PCT No.: PCT/EP2010/006855
§ 371 (c)(1),
(2), (4) Date: Jul. 23, 2012

(87) PCT Pub. No.: WO2011/050998
PCT Pub. Date: May 5, 2011

(65) Prior Publication Data
US 2012/0294362 A1  Nov. 22, 2012

Related U.S. Application Data

(60) Provisional application No. 61/279,984, filed on Oct. 29, 2009.

(51) Int. Cl.
*H04B 1/66* (2006.01)
*H04N 7/12* (2006.01)
(Continued)

(52) U.S. Cl.
CPC .......... *H04N 19/573* (2014.11); *H04N 19/527* (2014.11); *H04N 19/82* (2014.11); *H04N 19/86* (2014.11)

(58) Field of Classification Search
None
See application file for complete search history.

(56) References Cited

U.S. PATENT DOCUMENTS

| 6,807,231 B1 | 10/2004 | Wiegand et al. |
| 2002/0036707 A1* | 3/2002 | Gu .................. 348/497 |

(Continued)

FOREIGN PATENT DOCUMENTS

| CN | 101371585 A | 2/2009 |
| CN | 101455082 A | 6/2009 |

(Continued)

OTHER PUBLICATIONS

Japanese Notice of Grounds for Rejection (Office Action) Dated May 27, 2014, Application No. 2012-535689, 4 Pages.

(Continued)

*Primary Examiner* — Joseph Ustaris
*Assistant Examiner* — Rebecca Volentine
(74) *Attorney, Agent, or Firm* — Brooks Kushman P.C.

(57) ABSTRACT

The present invention relates inter alia to a method for processing an encoded video sequence, said method comprising the steps of: —reconstructing the encoded video sequence and providing a plurality of neighboring pictures; —transforming each of said neighboring pictures or at least a coherent region of each neighboring picture into the coordinate system of a reference picture based on a motion model, and thereby generating a picture stack comprising transformed pictures; —combining the pixel amplitudes of corresponding pixels of said transformed pictures using a weighting function, to form a processed pixel amplitude for at least one image pixel of the reference picture; and —generating a processed picture based on said at least one processed pixel amplitude of said image pixel.

8 Claims, 43 Drawing Sheets

(51) Int. Cl.
*H04N 11/02* (2006.01)
*H04N 11/04* (2006.01)
*H04N 19/573* (2014.01)
*H04N 19/82* (2014.01)
*H04N 19/527* (2014.01)
*H04N 19/86* (2014.01)

(56) References Cited

U.S. PATENT DOCUMENTS

| | | | |
|---|---|---|---|
| 2005/0105608 A1* | 5/2005 | Coleman et al. | 375/240.01 |
| 2006/0013310 A1* | 1/2006 | Lee et al. | 375/240.16 |
| 2007/0091997 A1* | 4/2007 | Fogg et al. | 375/240.1 |
| 2007/0206678 A1* | 9/2007 | Kondo | 375/240.17 |
| 2008/0056366 A1* | 3/2008 | Bhaskaran | 375/240.16 |
| 2009/0087111 A1* | 4/2009 | Noda | H04N 21/23892 382/238 |
| 2009/0279608 A1* | 11/2009 | Jeon et al. | 375/240.16 |
| 2010/0321583 A1* | 12/2010 | Shields et al. | 348/699 |
| 2012/0281758 A1* | 11/2012 | Orlick et al. | 375/240.14 |

FOREIGN PATENT DOCUMENTS

| | | |
|---|---|---|
| JP | 2007068036 A | 3/2007 |
| WO | 2007081838 A1 | 7/2007 |
| WO | 2007114368 A1 | 10/2007 |
| WO | 2008130367 A1 | 10/2008 |
| WO | 2009070508 A1 | 6/2009 |

OTHER PUBLICATIONS

Thomas Wiegand, Affine Multipicture Motion-Compensation Prediction, IEEE Transactions on Circuits and System for Video Technology, vol. 15, No. 2, Feb. 2005, pp. 197-209.

Alexander Glantz et al., Video Coding Using Global Motion Temporal Filtering, ICIP 2009 IEEE, 978-1-4244-5654-3/09—pp. 1053-1056.

PCT International Search Report Dated Mar. 24, 2011, Application No. PCT/EP2010/006855, Applicant Thomas Sikora, 4 Pages.

PCT International Preliminary Report on Patentability Written Opinion Dated May 1, 2012, Application No. PCT/EP2010/006855, Applicant Thomas Sikora, 8 Pages.

Chinese Office Action dated Aug. 31, 2015, Application No. 201080060562.5, Applicant: Vestel Elektronik Sanayi Veticaret A.S.

Chinese Office Action Dated Dec. 10, 2014, Application No. 201080060562.5, Applicant Vestel Elektronik Sanayi Ve Ticaret A.S., 5 Pages.

* cited by examiner

METHOD AND DEVICE FOR PROCESSING A VIDEO SEQUENCE

CROSS-REFERENCE TO RELATED APPLICATIONS

This application is a U.S. national phase of PCT Application No. PCT/EP2010/006855 filed Oct. 28, 2010, which, in turn, claims the benefit of U.S. provisional Application No. 61/279,984 filed Oct. 29, 2009, the disclosures of which are incorporated in their entirety by reference herein.

The present invention relates to a method and device for processing a video sequence.

BACKGROUND OF THE INVENTION

In modern communication systems video compression/coding is of prime importance. Due to limited bandwidth allocation often so-called lossy algorithms are employed (e.g. in state-of-the-art video coding standard H.264/AVC [1]). These algorithms use quantization of pixels or transform coefficients to adjust bit rate to channel capacity. This results in more or less visible coding artifacts in many applications.

OBJECTIVE OF THE PRESENT INVENTION

An objective of the present invention is to provide a method for efficient processing of a noisy digital video sequence in order to reduce noise for predictive video coding and/or post-filtering applications.

A further objective of the present invention is to provide a device system capable of efficient processing of a noisy digital video sequence in order to reduce noise for predictive video coding and/or post-filtering applications.

BRIEF SUMMARY OF THE INVENTION

An embodiment of the invention relates to a method for processing an encoded video sequence, said method comprising the steps of:
  reconstructing the encoded video sequence and providing a plurality of neighboring pictures;
  transforming each of said neighboring pictures or at least a coherent region of each neighboring picture into the coordinate system of a reference picture based on a motion model, and thereby generating a picture stack comprising transformed pictures;
  combining the pixel amplitudes of corresponding pixels of said transformed pictures using a weighting function, to form a processed pixel amplitude for at least one image pixel of the reference picture; and
  generating a processed picture based on said at least one processed pixel amplitude of said image pixel.

For instance, the reconstruction of the encoded video sequence may be carried out by decoding the encoded video sequence.

Preferably, a length value is assigned to the processed picture, said length value defining the number of the neighboring pictures of said picture stack.

For instance, a filtered video sequence may be generated by incorporating said processed picture into the reconstructed video sequence. A marker bit is preferably assigned to signal the presence of the processed pixel amplitude in the video sequence.

Said step of transforming neighboring pictures may include transforming prior and consecutive pictures, relative to the reference picture.

Moreover, further video sequences having spatially adjacent pictures that comprise image pixels corresponding to those of said transformed pictures, may be taken into account to form said processed pixel amplitude of said image pixel.

Furthermore, at least two different process modes may be carried out, wherein, in each process mode, a maximum number of pictures is considered for generating the image stack, and wherein a flag is assigned which indicates the process mode that has been carried out in the bit stream.

Further, the method may comprise the step of generating an encoded bit stream.

Said processed picture mentioned above, may be used for predicting a picture.

According to a further preferred embodiment, the method may also comprise the following steps for encoding the reference picture:
  defining a plurality of picture stacks, each picture stack comprising an individual number of neighboring pictures relative to the reference picture;
  for each picture stack, transforming each of said neighboring pictures or at least a coherent region of each neighboring picture into the coordinate system of the reference picture, based on a motion model, and thereby generating a stack of transformed pictures, and combining the pixel amplitudes of corresponding pixels of said transformed pictures using a weighting function, to form a processed pixel amplitude for at least one image pixel of the reference picture, and generating a processed picture based on said processed pixel amplitude of said at least one image pixel, and assigning to each processed picture a length value defining its individual picture stack length;
  generating for each processed picture a predicted picture which refers to the reference picture;
  encoding the reference picture using the processed picture and generating the encoded bit stream;
  adding a value, which indicates the individual picture stack length of the picture used for encoding, to the encoded bit stream; and
  encoding the parameters for transforming each of said neighboring pictures or at least a coherent region of each neighboring picture into the coordinate system of a reference picture based on a motion model to the encoded bit stream.

For instance, for each processed picture, the deviation between the predicted picture and the reference picture may be determined, and the processed picture having the smallest deviation may be determined. Then, the reference picture may be encoded using the processed picture that has the smallest deviation.

The processed picture, which has the smallest deviation, may be determined by calculating the absolute error, squared error, mean squared error, root mean squared error or any related metric of said error measurements between the processed pictures and the reference picture.

In addition to said predicted pictures, an unfiltered predicted picture may be generated by carrying out a prediction based on at least one picture preceding the reference picture. The predicted images and the unfiltered predicted image may be divided into blocks. Each block of the reference picture may be encoded based on the corresponding block of one of the predicted images or the corresponding block of the unfiltered predicted image. For each block, a flag may be provided which indicates whether a block may be encoded using one of the predicted images or the filtered predicted image. Said flag may be included into the encoded bit stream.

Further, the deviation between each block of the predicted images and each corresponding block of the reference image may be determined. Moreover, the deviation between each block of the unfiltered predicted image and each corresponding block of the reference image may be determined. Then, each block of the reference picture may be encoded based on the corresponding block of one of the predicted images or the corresponding block of the unfiltered predicted image, depending which of those shows the smallest deviation.

The motion model is preferably a translational, affine, perspective and/or a parabolic motion model.

The invention also relates to a decoder which is capable of carrying out any of the methods described above.

The invention also relates to an encoder which is capable of carrying out any of the methods described above.

BRIEF DESCRIPTION OF THE DRAWINGS

In order that the manner in which the above-recited and other advantages of the invention are obtained will be readily understood, a more particular description of the invention briefly described above will be rendered by reference to specific embodiments thereof which are illustrated in the appended figures. Understanding that these figures depict only typical embodiments of the invention and are therefore not to be considered to be limiting of its scope, the invention will be described and explained with additional specificity and detail by the use of the accompanying drawings in which.

The invention described hereinafter enables efficient processing of a noisy digital video sequence by exploitation of global motion temporal filtering for predictive video coding and/or post-processing. Therefore, global motion between pictures or regions of a sequence or views in a multi-view coding scenario is estimated and compensated for. This produces a noise-reduced representation of the sequence for post-filtering, motion estimation enhancement or even prediction.

Figure 1:
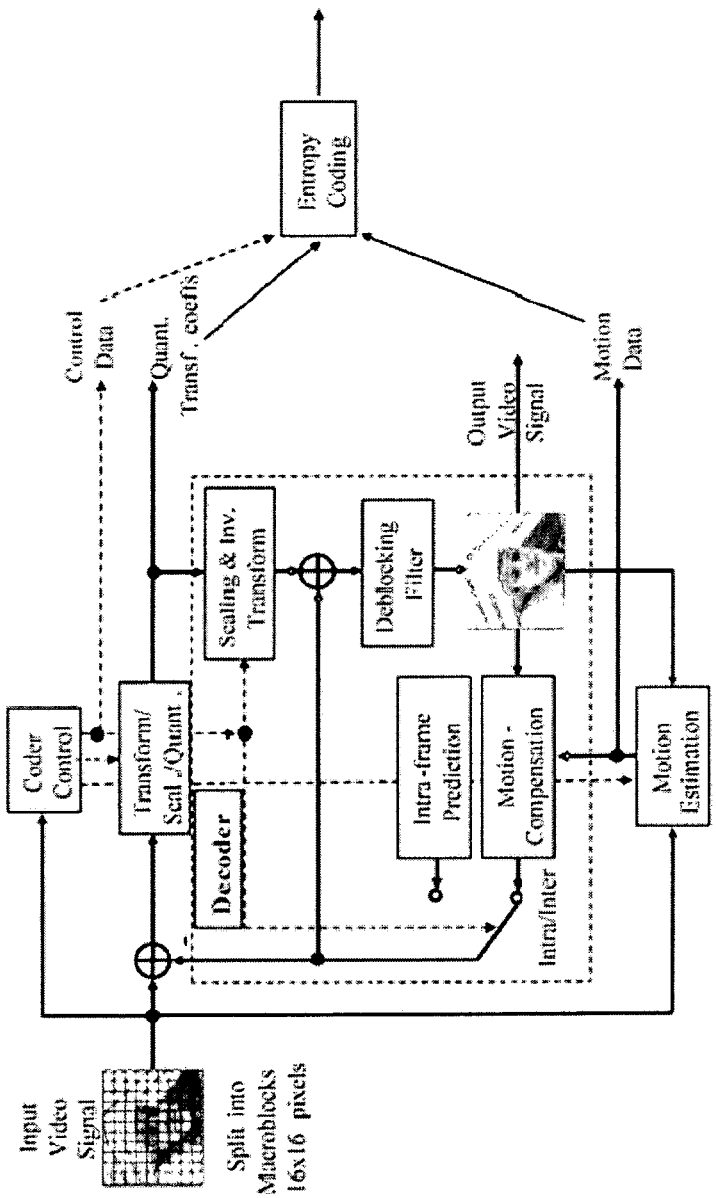
FIG. 1 shows in an exemplary fashion the basic encoding structure of H.264/AVC [1]

A common hybrid video encoder subtracts a prediction from the original signal to generate residual data. These residuals are then transformed block by block, quantized and sent to the receiver. The encoder also comprises a local decoder. The local decoder rescales the quantized transform coefficients and inversely transforms them to generate a representation of the residual data and with it a representation of the original signal. A set of previously decoded pictures stored in the picture buffer is used to generate the prediction signal. A typical hybrid video encoder is depicted in FIG. 1.

One of the still existing problems in video coding today are distortions, i.e. blocking artifacts, that strongly affect the perceived visual quality at the receiver and the objective quality of the prediction signal. There are mainly two reasons for these artifacts. One of them is the quantization of transform coefficients. Depending on the coarseness of quantization, this can cause visually disturbing edges between block boundaries. The second source is the motion compensated prediction. Here, blocks are predicted from temporally neighboring pictures that already have been locally decoded and therefore contain discontinuities at block boundaries. These are often copied into the interior of the prediction signal. It is desirable to reach an objective quality enhancement of the locally decoded data. In that way the prediction signal could be improved which would mean smaller residual data and therefore less bit rate to spend for transmission of the video signal. Furthermore, the reduction of blocking artifacts after decoding of the transmitted data would lead to a better subjective perception of the video signal.

Research on the solution of these problems has been vast. The H.264/AVC standard [1] defines a deblocking filter that is based on the work by List et al. [2]. The algorithm first tries to distinguish between different kinds of discontinuities using boundary analysis. Here, it is assumed that depending on the kind of neighboring blocks, i.e. intra or inter coded, boundaries are more or less severe. The second step is spatial filtering of horizontal and vertical edges. Although subjective quality and the prediction signal could be improved significantly, blocking artifacts are still visible in the decoded video at low bit rates.

Beside spatial techniques like the one mentioned above, temporal correlation between the picture to transmit and its locally decoded temporal neighbors has been used to improve the quality of the prediction signal. These so-called motion-compensated prediction (MCP) schemes achieve compression by exploiting the similarities between successive pictures of a video signal.

Bi-predictive (B) and hierarchical B picture coding [3] techniques use information from one or two locally decoded pictures situated in the neighborhood of the current picture to be encoded. Here, a macroblock of the current picture is predicted using block-based motion estimation techniques. If more than one block is used for the generation of the prediction signal, a weighted mean of all possible candidates is used. However, the motion between two corresponding blocks is only estimated using a translational motion model. In the case of camera zoom, rotation, shearing and perspective transformation respectively, this model is not sufficiently describing the relationship between two blocks leading to an inadequate prediction.

The usage of previously decoded pictures for motion estimation and compensation has been extended to a variable time delay in reference picture selection by the work of Wiegand et al. [4]. In long-term memory MCP the spatial displacement vector for a macroblock can point to an arbitrarily distant reference picture bounded only by previous negotiation between encoder and decoder. The variable time delay has to be transmitted as side information to the receiver creating additional bit rate, which is justified by improved MCP. This technique has also been made mandatory in all existing profiles in the current H.264/AVC standard.

The prediction of a macroblock with a variable time delay, i.e. from a reference picture that is not a direct temporal neighbor to the current one, can be extended to the superposition of references from several pictures. This is called multi-hypothesis MCP and has been proposed e.g. in [5]. Here, the prediction signal is a linear superposition of several MCP signals. Since all of these blocks are referenced by individual motion vectors and a variable time delay, rate-distortion optimization (RDO) has to be utilized for best performance. Nevertheless, the candidate blocks for superposition are blocks that have been copied from previously decoded pictures using only a translational motion model. This imposes similar constraints as in common block-based MCP.

In affine multipicture MCP [6] the idea of long-term MCP has been extended to the usage of previously decoded pictures with a variable time delay and warped versions thereof. The warping is performed by estimation of global motion parameters between the reference picture and the current picture to be encoded. In [6], an affine higher-order motion model is used. The block-based MCP is then performed on the common long-term picture buffer and on the set of their warped representations.

The Advanced Simple Profile of MPEG-4 Part 2/Visual [7] defines global motion compensation (GMC) as an additional prediction mode. Other than conventional MCP techniques the motion between a picture to be encoded and its reference is not estimated on a block-basis using a translational motion model but on a picture-basis for higher-order motion models that extend the translational model by parameters describing zoom, rotation, and shearing. The parameters of the motion model have to be transmitted as side information to the encoder, which adds additional bit rate. Using GMC it is possible to predict large coherent areas with all different kinds of motion in an efficient way reducing residuals and therefore bit rate needed for transmission. During the standardization of MPEG-4 Visual a technique called sprites has been considered as a model of the background of a sequence. The advantage of these models is that it exploits statistical long-term dependencies very efficiently. These sprites can be generated either online or offline which is referred to as Dynamic Sprites or Static Sprites. Only Static Sprites are part of the MPEG-4 Visual standard.

Here, an approach for temporal filtering of previously decoded pictures is presented based on global motion estimation (GME). Since the algorithm presented herein is capable of reducing quantization noise and blocking artifacts, it can be both used for deblocking purpose to enhance the subjective perception at the receiver and for prediction signal enhancement and therefore bit rate reduction. Other than the state-of-the-art approaches presented above, it combines a long-term memory picture buffer with the usage of higher-order motion models to cope with other kinds of motion than only translational and the superposition of several spatially aligned signals from previously decoded pictures.

For a given reference, several temporally neighboring pictures containing blocking artifacts are transformed into the reference's coordinate system to build a stack of spatially aligned images. For the transformation, the global motion, i.e. the camera motion between a picture and its reference, has to be known. This can be done using any GME algorithm that is based on higher-order motion models. A filtered version of the reference picture is then created by superposition of all spatially aligned pictures in the image stack. Thus, quantization noise and blocking artifacts are reduced using temporal averaging. The filtered representation of the reference picture can then be used for several purposes in common hybrid video coding.

The invention described in this document addresses several applications that comprise various embodiments of the approach outlined above.

The first application is post-processing at the receiver to improve the subjective perception of the reconstructed video sequence. For a given reference picture to be displayed to the receiver, a certain set of decoded pictures available in the picture buffer is superimposed to generate an enhanced representation. The indices of the pictures to be used for filtering can be estimated at the encoder, since only there the original picture is available. Possible subsets of the picture buffer are filtered and compared to the original picture using any objective video quality assessment metric. If estimated at the encoder, the indices of the best subset are transmitted to the receiver generating additional bit rate.

The second application is the enhancement of reference pictures in MCP using block-based motion estimation. Normally, motion estimation is performed using a locally decoded picture from the picture buffer. Since depending on the coarseness of quantization step size, this picture contains quantization noise and blocking artifacts, block-based motion estimation leads to suboptimal motion vectors and high residual values. The reference picture can be enhanced using the algorithm presented herein. For a given reference picture that is going to be used as reference for MCP, temporally neighboring pictures that are also available in the picture buffer are transformed into its coordinate system and superimposed. It can be shown that MCP leads to improved results using this filtered representation of the reference picture. Additionally, the temporal filtering approach can be combined with spatial deblocking as defined in state-of-the-art video coding standards.

The third application is an additional prediction mode, incorporated into the video coding environment besides common intra and inter prediction. A certain set of pictures available in the picture buffer is transformed directly into the coordinate system of the picture currently to be encoded and gets superimposed. In that way, large areas inside the picture can be efficiently predicted using information from temporal neighbors.

All embodiments can be realized using pixel-based global motion estimation on the pictures inside the picture buffer and using motion vector field-based global motion estimation, respectively. Additionally, filtering can not only be done on temporally neighboring but also on spatially adjacent pictures, as is the case in 3D or multi-view video coding. Here, filtering is extended to process temporally and spatially adjacent pictures from each view. Moreover, even depth maps can be included in the filtering approach.

Global Motion Temporal Filtering

Simple techniques for noise reduction in a given signal are based on averaging. We assume blocking artifacts after encoding and decoding have the same characteristics as white noise. In that way, we can apply the temporal mean filtering idea for blocking artifacts and quantization noise reduction. Given the availability of a certain set of noisy representations Y of an image signal X, distortions can be reduced for every pixel x(m,n) using the arithmetic mean. For that purpose, the sum of N versions of image signal X is computed pixel by pixel. Let $$y_k(m,n) = x(m,n) + n_k(m,n)$$

be the distorted pixel value of the kth image. The mean value is computed as $$y(m, n) = \frac{1}{N}\sum_{k=1}^{N} y_k(m, n) = x(m, n) + \underbrace{\frac{1}{N}\sum_{k=1}^{N} n_k(m, n)}_{r(m,n)},$$

where r(m,n) is the mean noise signal. White noise is assumed with the variance $\sigma_n^2$ and the autocorrelation matrix $$R_{NN}(i,j) = E[N_i(m,n)\, N_j(m,n)] = \begin{cases} \sigma_N^2 & i = j \\ 0 & \text{else} \end{cases}.$$

The variance of the noise is reduced by factor N using the temporal filtering approach. The variance of the mean noise signal can then be calculated as $$\sigma_R^2 = E[R^2(m,n)] = \frac{1}{N^2}\sum_{i=1}^{N}\sigma_N^2 = \frac{\sigma_N^2}{N}$$

Thus, the variance of the noise has been reduced by the factor N.

The picture buffer of a common hybrid video codec contains decoded pictures from the video sequence. Depending on the coarseness of quantization, blocking artifacts and quantization noise in these pictures are more or less severe. We use the theoretical background presented above as an efficient means to enhance the quality of the decoded data. This leads to better subjective perception and also increases the quality of generated prediction signals inside both the encoder and the decoder, respectively.

Since many video sequences have been recorded with a moving camera, the background region of these sequences is not fixed. In terms of the theoretical consideration this means, that the picture buffer does not contain a set of equal signals only differing by the superimposed noise but of a set of different signals containing noise. This problem can be solved using higher-order motion models that account for the motion a camera performs and compensate for this motion so that the signals are spatially aligned. The spatially aligned representations can then be considered as equal signals differing only by noise. In most of the cases an 8-parametric higher-order motion model like the well-known perspective motion model $$x_q = \frac{m_0 x_p + m_1 y_p + m_2}{m_6 x_p + m_7 y_p + 1}$$

$$y_q = \frac{m_3 x_p + m_4 y_p + m_5}{m_6 x_p + m_7 y_p + 1}$$

describes the background movement sufficiently well. In the above equation, $(x_p, y_p)^T$ is the location of a pixel in picture $I_p$ and $(x_q, y_q)^T$ is its corresponding position in picture $I_q$.

The parameters $m_0$ to $m_7$ describe the motion by means of translation, scaling, rotation, and perspective transformation.

The motion model for a pair of pictures from the picture buffer can be estimated using any GME algorithm. Basically, there are two classes of algorithms, i.e. pixel- and motion vector-based. While pixel-based techniques perform very well, they lack of low computational complexity. However, motion vector-based approaches are often very fast but perform worse.

A pixel-based algorithm can be e.g. a hierarchical gradient descent approach based on [8,9]. This algorithm first generates a 4-step image pyramid for the two pictures to register. The image pyramid contains the original pictures, two down-sampled versions and one in the upsampled domain. For down-sampling a 5-tap Le-Gall wavelet filter is used and for upsampling a 7-tap Daubechies wavelet filter. The first gradient descent step is performed on the coarsest resolution and is initialized with a translational motion model using the feature tracker presented by Kanade et al. [10]. The algorithm then performs a gradient descent step in every other layer of the image pyramid using the motion parameters from the step before as initialization. In that way, for a sequence with N pictures a set of transformation matrices $$T = \{W_{0,1}, W_{1,2}, \ldots W_{N-2,N-1}\}$$

and its inverted correspondences $$T_{inv} = \{W_{0,1}^{-1}, W_{1,2}^{-1}, \ldots, W_{N-2,N-1}^{-1}\}$$

describing the short-term displacement between temporally neighboring pictures can be created, where $$W_{p,q} = \begin{bmatrix} m_{0,p,q} & m_{1,p,q} & m_{2,p,q} \\ m_{3,p,q} & m_{4,p,q} & m_{5,p,q} \\ m_{6,p,q} & m_{7,p,q} & 1 \end{bmatrix}.$$

Figure 2:
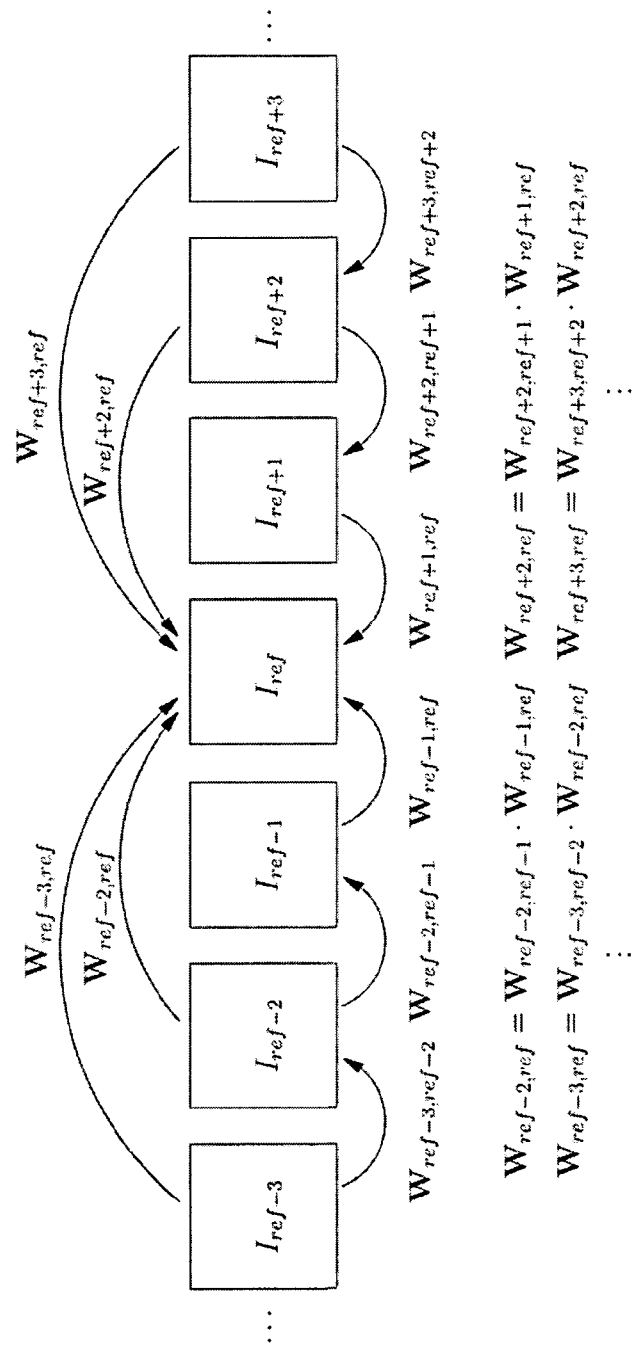
FIG. 2 shows in an exemplary fashion a generation of long-term global motion parameters.

These short-term motion models can then be converted into long-term parameter sets by simple matrix multiplication. In that way, the motion between any arbitrary pair of pictures from the set is obtained. The generation of long-term motion models is depicted in FIG. 2.

Figure 3:
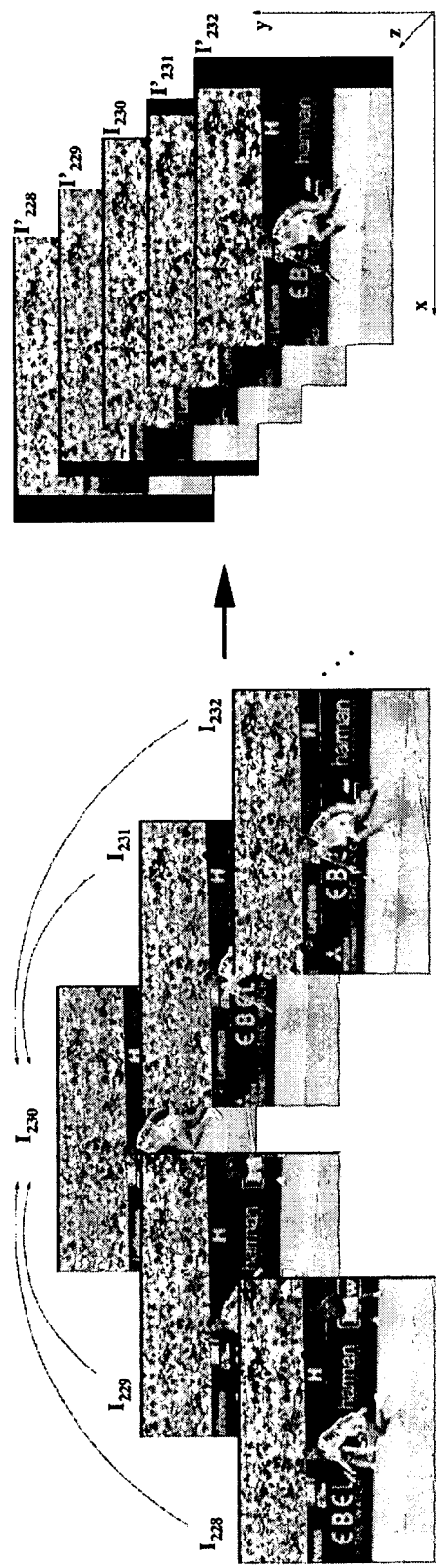
FIG. 3 shows an example for the generation of a set of spatially aligned pictures before temporal filtering is performed.

Assuming that a set of N pictures from the picture buffer shall be used for global motion temporal filtering. First, the reference coordinate system has to be selected. This can be the coordinate system of any picture from the picture buffer or even the picture currently to be encoded. For the transformation of a picture into the selected coordinate system, the long-term motion between the picture and its reference is then compensated for. In that way, a stack of spatially aligned pictures is created, which is shown exemplary in FIG. 3.

The pictures in the stack are then merged together to build a filtered representation of the reference picture. For this purpose, a so-called blending filter is used. The blending filter can be any approach, e.g. computation of the weighted arithmetic mean depending on the temporal distance to the reference picture, or simply the median value of all pixels that are superimposed. Depending on the strength of foreground or background motion, foreground objects vanish from the filtered representation of the reference picture. Therefore, in some applications an additional segmentation step can be performed on the reference picture before filtering so the receiver can reconstruct the foreground objects after filtering.

The technique for generation of a global motion-compensated temporally filtered picture in a video sequence can as well be applied for super-resolution picture construction, i.e. an approach that generates a high-resolution counterpart of a picture from several representations with a lower resolution. Algorithms for super-resolution picture generation are based on the fact that an arbitrary pixel is normally observed in a multitude of pictures from a sequence. After motion-compensation, the pixel's transformed coordinates seldom fall on full integer pel positions. Therefore, generation of a higher resolution version is possible. In some of the embodiments described below, this fact can be exploited for sub-pel motion estimation accuracy. Since the temporally filtered picture is generated anyway, one can also construct a super-resolution version of it, which replaces the inbuilt interpolation in common hybrid video coding environments.

Application Scenarios

In this section, three possible application scenarios and various embodiments for the algorithm presented in Section 2 incorporated into a common hybrid video coding environment are presented.

The first scenario describes its usage as a post-processing filter for the receiver where the best possible quality can be assessed at the encoder.

In the second scenario the global motion temporal filtering approach is used at the same position in encoder and decoder as the common H.264/AVC deblocking filter. Here, its purpose is to enhance MCP and therefore to improve prediction signal generation, to reduce residual values and bit rate needed for transmission. Additionally, the temporal filtering approach can be combined with common spatial deblocking techniques.

The last scenario adds a new prediction mode to the video coding environment besides common intra and inter prediction. Here, the encoder can decide in terms of RDO whether a macroblock is predicted using one of the common modes or the new global motion temporal filtering mode.

Post-Processing

Figure 4A:
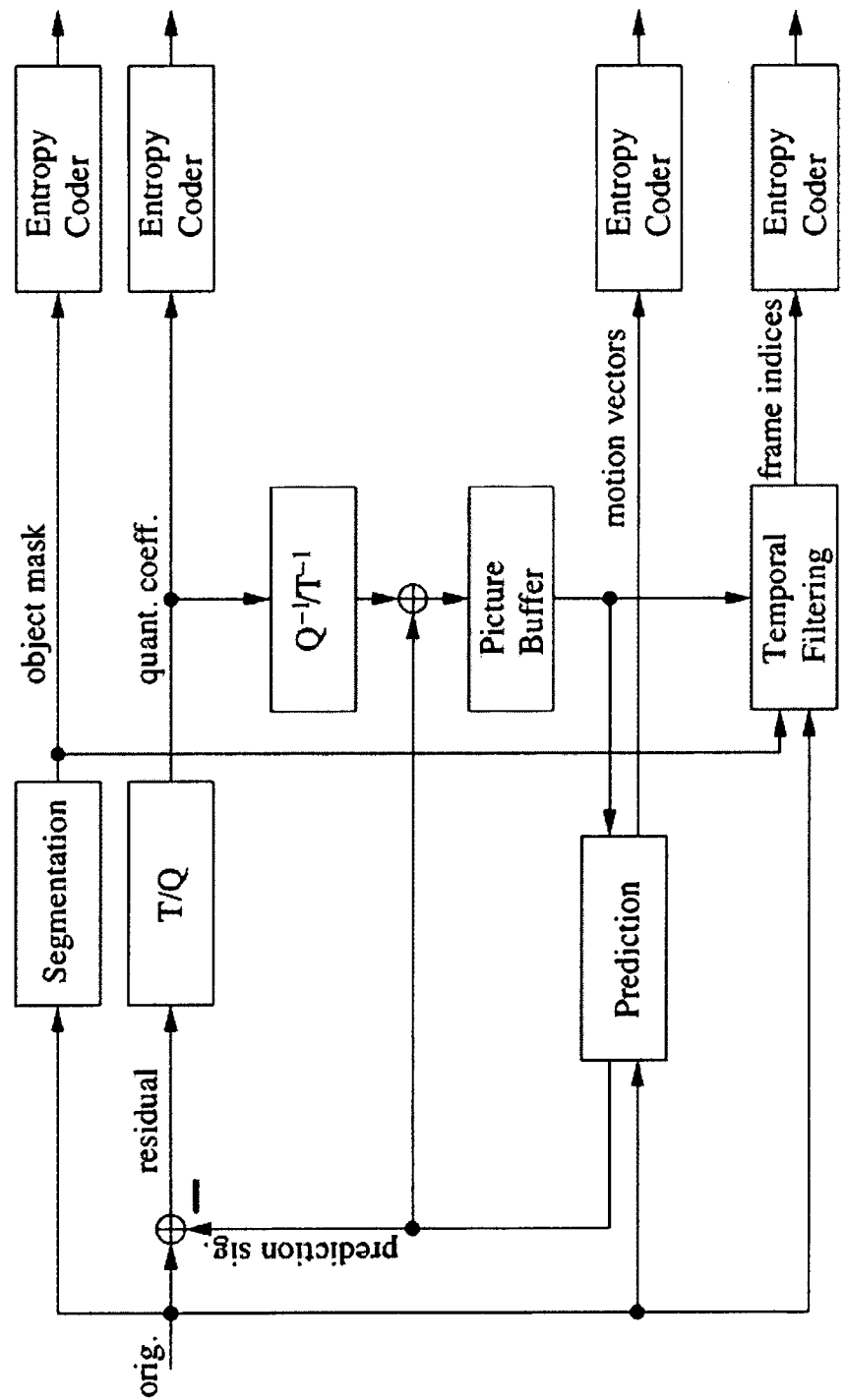
FIG. 4 shows in an exemplary fashion a temporal filtering for post-processing within a hybrid video coding environment, wherein temporal filtering is performed both at encoder and decoder using segmentation and pixel-based GME, and wherein the frame indices used for filtering are transmitted to the receiver.
Figure 4B:
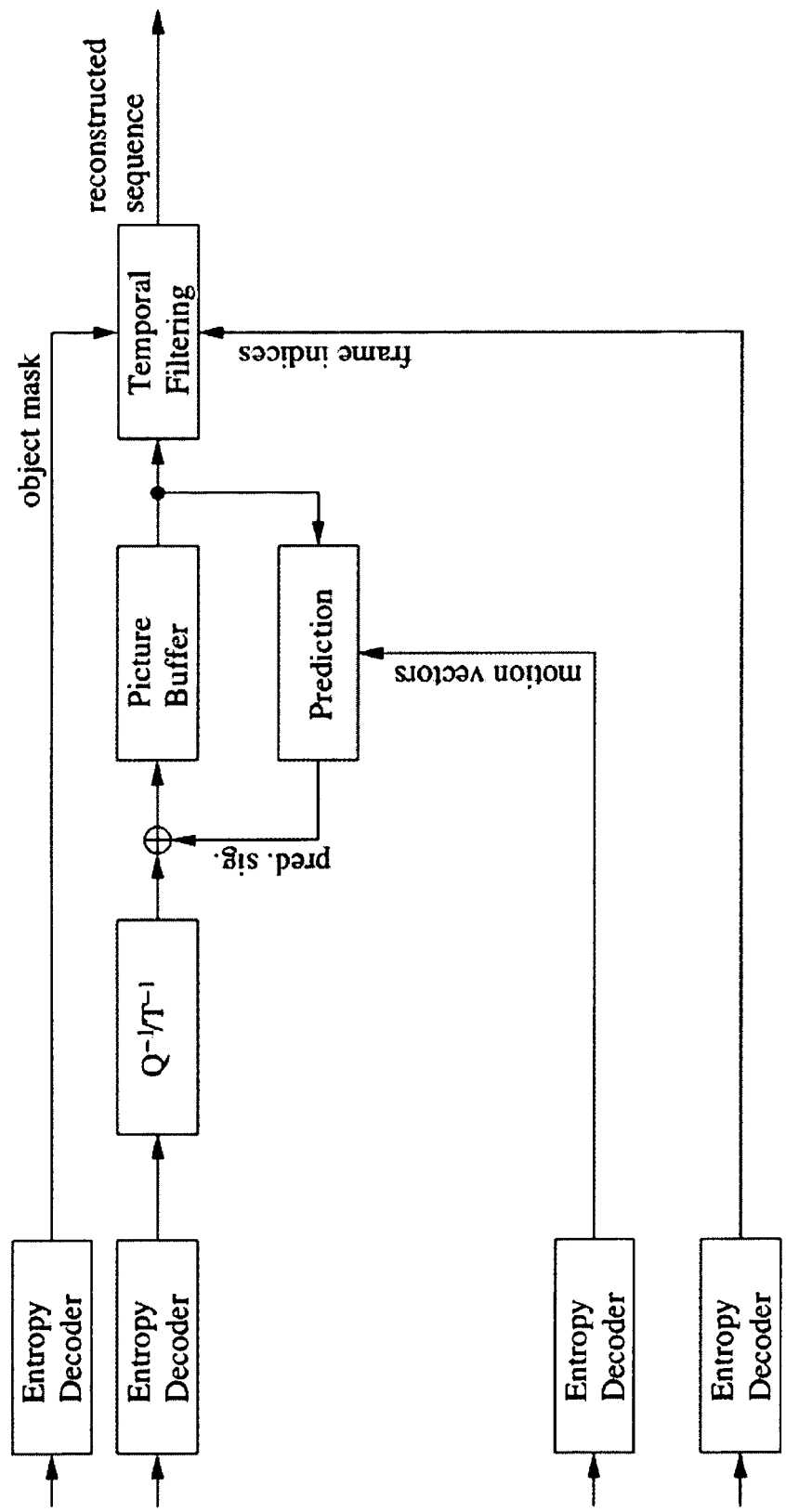

In a first preferred embodiment, the approach described above can be used to ensure the best possible quality of the video is presented to the receiver. The global motion temporal filtering algorithm incorporated in a common hybrid video coding environment can be seen in FIG. 4. For simplicity, information that is not important here has been omitted. The algorithm is performed both at the encoder and the decoder. At the encoder side this is merely done to choose the best possible set of distorted temporally neighboring pictures from the picture buffer to generate a filtered version of the current picture.

The algorithm is not directly incorporated into the encoder loop but has access to the picture buffer and the original picture. Depending on the kind of prediction structure, i.e. using I-, P-, or B-pictures, the picture buffer contains a set of temporal neighbors $I_{pb,t-i}$ of the current picture $I_t$. However, the picture buffer can also contain spatially adjacent pictures from different views in a multi-view coding environment. As soon as the current picture has been locally decoded it is also stored inside the picture buffer as a distorted representation $I_{pb,t}$. All or just a subset of the elements inside the picture buffer can then be used to build a filtered representation $I_{t,filtered}$ of the current picture. Assuming the current picture has just been locally decoded and is now part of the picture buffer. The global motion temporal filtering algorithm now successively transforms pictures or just coherent regions of the pictures into the coordinate system of $I_{pb,t}$. Therefore, the long-term motion parameters between the pictures involved have to be known. Thus, GME is performed between the pictures, or regions, in the buffer. By transforming a subset of the picture buffer into the coordinate system of $I_{pb,t}$ an image stack is created that is blended together to form a preliminary filtered representation of the current picture. The algorithm could create preliminary representations for all possible subsets of the picture buffer. Here, only a set of successive pictures is used, since depending on the picture buffer size using all possible subsets would be a problem of computational complexity.

Figure 5:
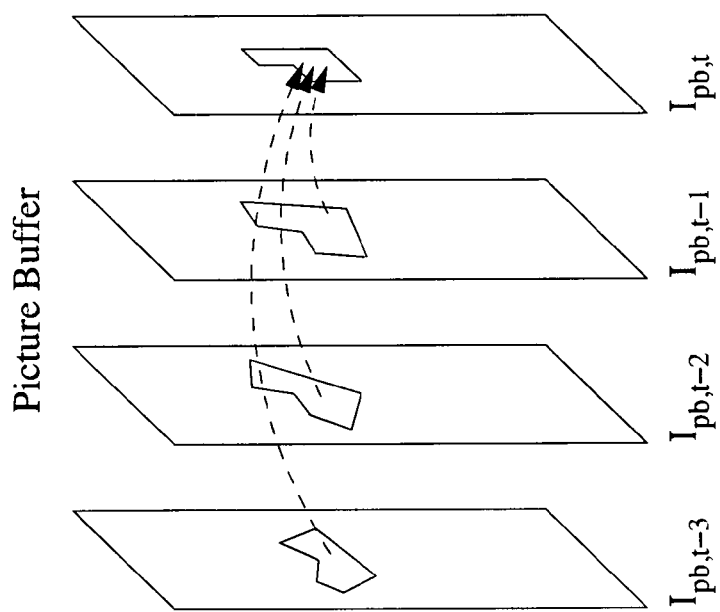
FIG. 5 shows an example for the generation of a filtered version of picture $I_t$ from previously decoded pictures for post-processing, wherein the pictures inside the picture buffer can be past and/or future pictures of the sequence as well as pictures from different views in a multi-view coding environment.

FIG. 5 shows the exemplary transformation process of pictures inside the picture buffer. It can be seen, that the current picture $I_{pb,t}$ has been stored inside the picture buffer besides its temporal or spatial neighbors $I_{pb,t-1}$ to $I_{pb,t-3}$. In this example, just a small coherent region of some macroblocks shall be filtered, although the algorithm is not restricted to small regions and could be performed on the whole picture as well. It can be seen, that the region, which is subject to filtering, has been run through transformation in the former pictures. This transformation can be reversed by compensating for the global motion. Therefore, the long-term global motion between picture $I_{pb,t}$ and its neighbors has been estimated using the GME algorithm presented in Section 2. The regions are transformed into the coordinate system of picture $I_{pb,t}$, which creates an image stack of spatially aligned pictures.

Figure 6:
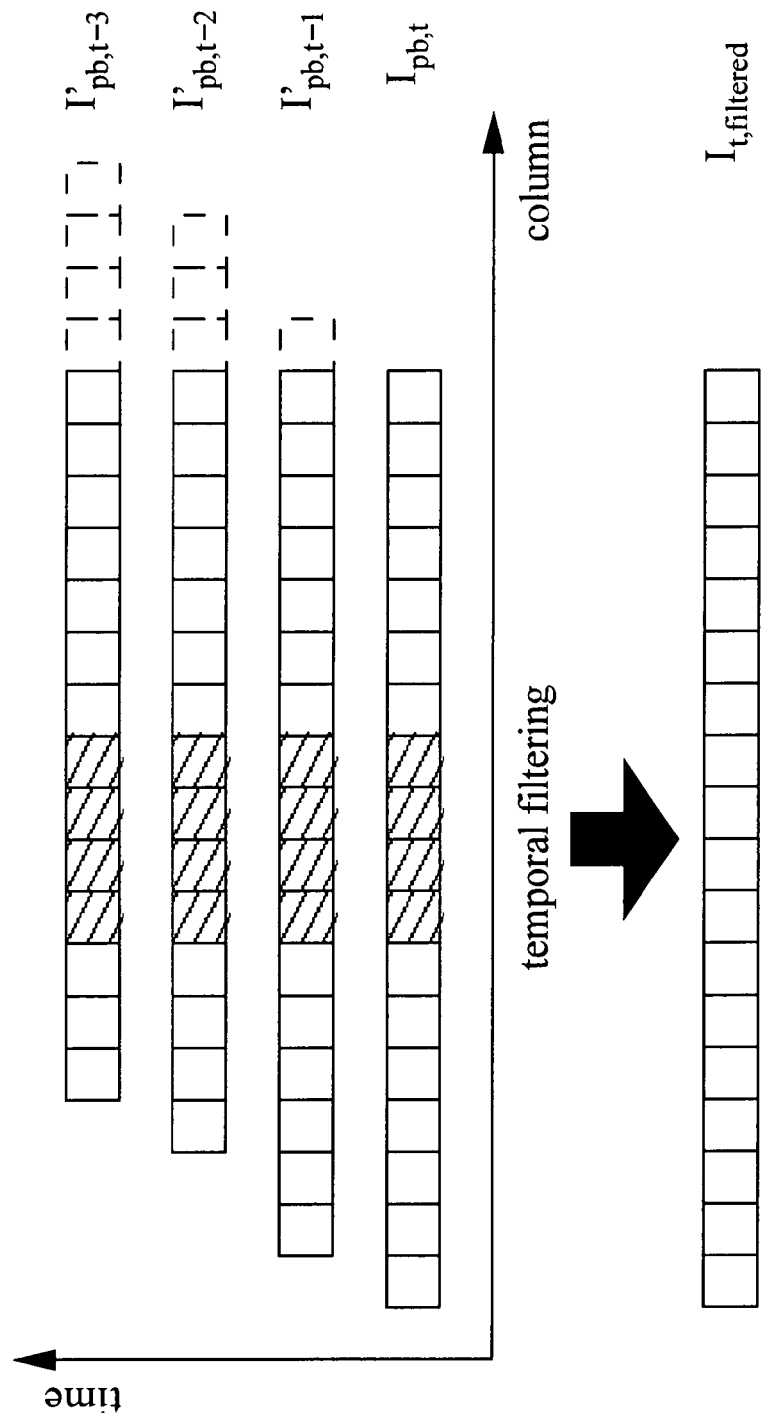
FIG. 6 shows in an exemplary fashion a temporal filtering process for post-processing, wherein one line $y_k$ from a set of aligned pictures is depicted.

Part of this image stack can be seen in FIG. 6. Depicted is one line of spatially aligned pictures. The pixels inside the regions that are to be filtered are shaded. The picture $I_{pb,t}$ itself and the transformed representations of its neighbors $I'_{pb,t-1}$ to $I'_{pb,t-3}$ are blended together using a given filter on the shaded region. Thereby, a preliminary filtered representation is generated. The representation with the highest quality is chosen as the final filtered picture $I_{t,filtered}$. The number of pictures or their indices used for the generation are transmitted as side information to the receiver.

To measure the quality, every preliminary representation is compared to the original picture $I_t$ using an objective quality assessment metric like PSNR or SSIM on the background regions. Depending on the region that is subject to filtering, an additional segmentation step that divides the region into background and foreground areas can be necessary before quality assessment. This is due to the fact that foreground objects often move other than the global motion and therefore vanish in the filtered picture. On the other hand, if the complete region complies with the global motion, no segmentation has to be performed. Segmentation can take place in a preprocessing step using the uncompressed data or using the picture buffer. Since it is only necessary to ensure a correct binary mask, the algorithm is not further defined. Herein, we use an anisotropic diffusion-based background subtraction technique [11]. Using this mask, it is possible to reconstruct the foreground segments at the receiver that have been removed during the global motion temporal filtering step. At the encoder, this mask is merely used to exclude foreground regions from the quality measurement. Foreground areas can later on be filtered using common spatial deblocking techniques.

Besides the common bit stream, the encoder transmits the binary foreground object mask if it has been created using the original video data. Also transmitted is the number of pictures or its indices used for generation of the filtered representation. In that way, the receiver can reconstruct the sequence by repeating the generation step and reconstruction of the foreground segments.

Figure 7A:
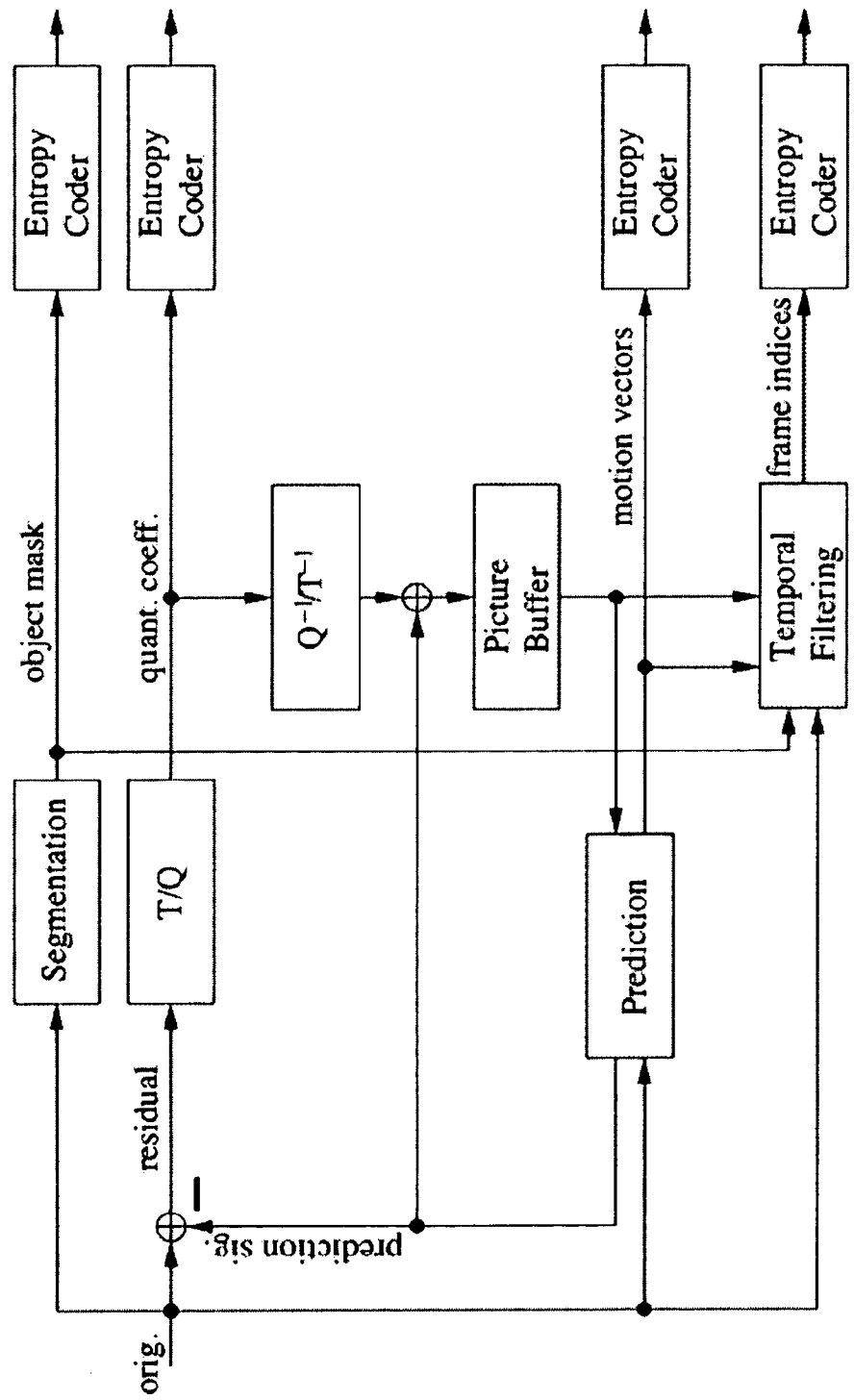
FIG. 7 shows in an exemplary fashion a temporal filtering for post-processing within a hybrid video coding environment, wherein temporal filtering is performed both at encoder and decoder using segmentation and motion vector-based GME, and wherein the frame indices used for filtering are transmitted to the receiver.
Figure 7B:
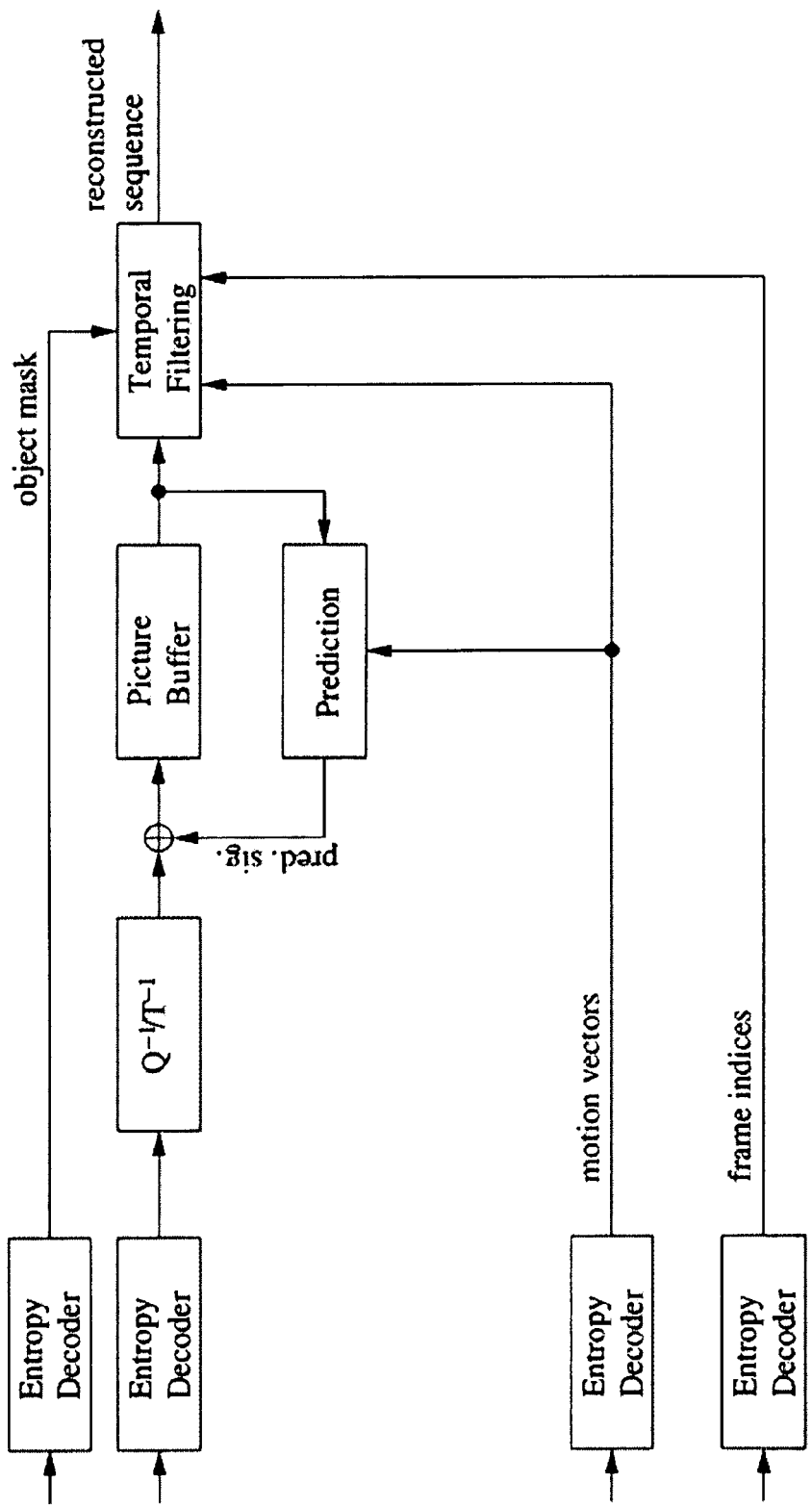

In a second preferred embodiment, temporal filtering is performed both at the encoder and the decoder. This is depicted in FIG. 7. The temporal filtering has access both to the picture buffer and the motion vectors produced by motion compensated prediction. Other than the first preferred embodiment, motion vectors are used for GME. Therefore, the temporal filtering at the decoder has access to the motion vectors as well, to reproduce the result at the encoder. Again, additional segmentation is performed to exclude foreground areas from being filtered. This embodiment can be extended to a multi-view coding scenario where the picture buffer is made up of spatially adjacent pictures from different views.

Figure 8A:
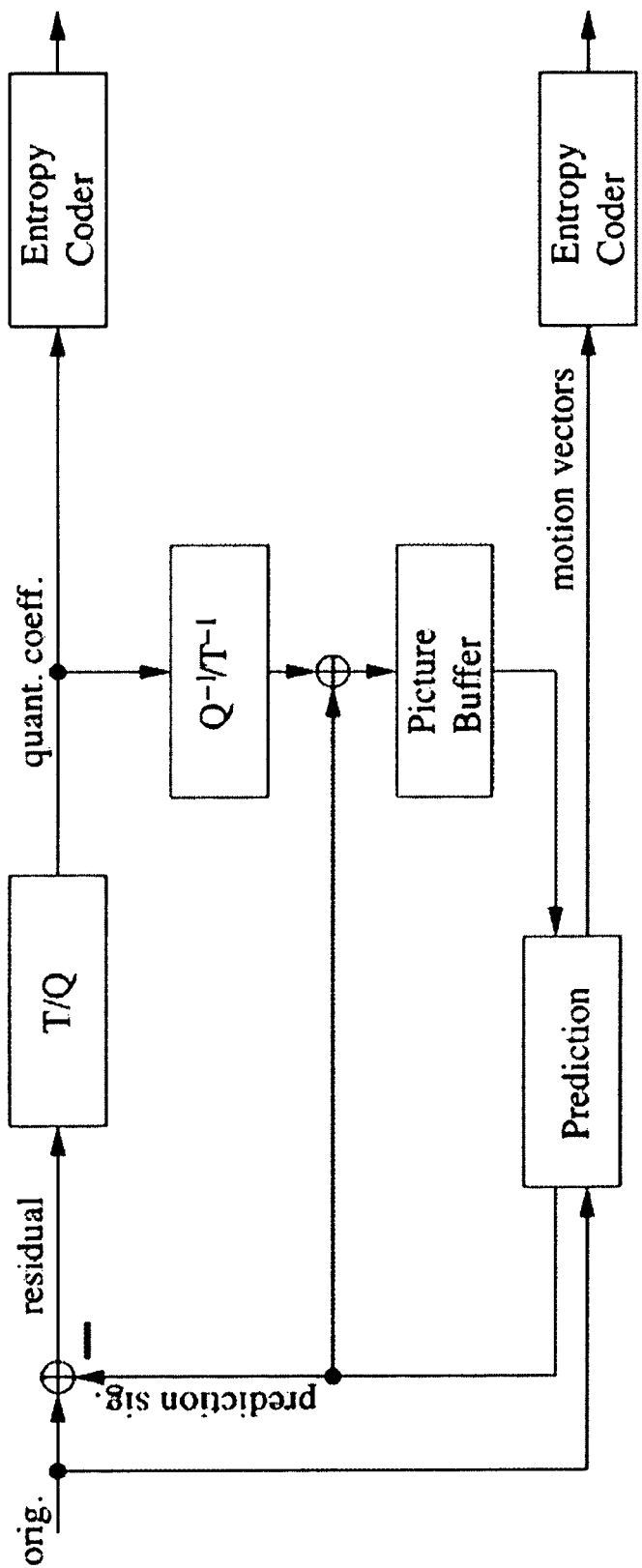
FIG. 8 shows in an exemplary fashion a temporal filtering for post-processing within a hybrid video coding environment, wherein the temporal filtering is performed only at the decoder using pixel-based GME, and wherein the frame indices used for filtering are not transmitted to the receiver, and wherein the encoder is unchanged.
Figure 8B:
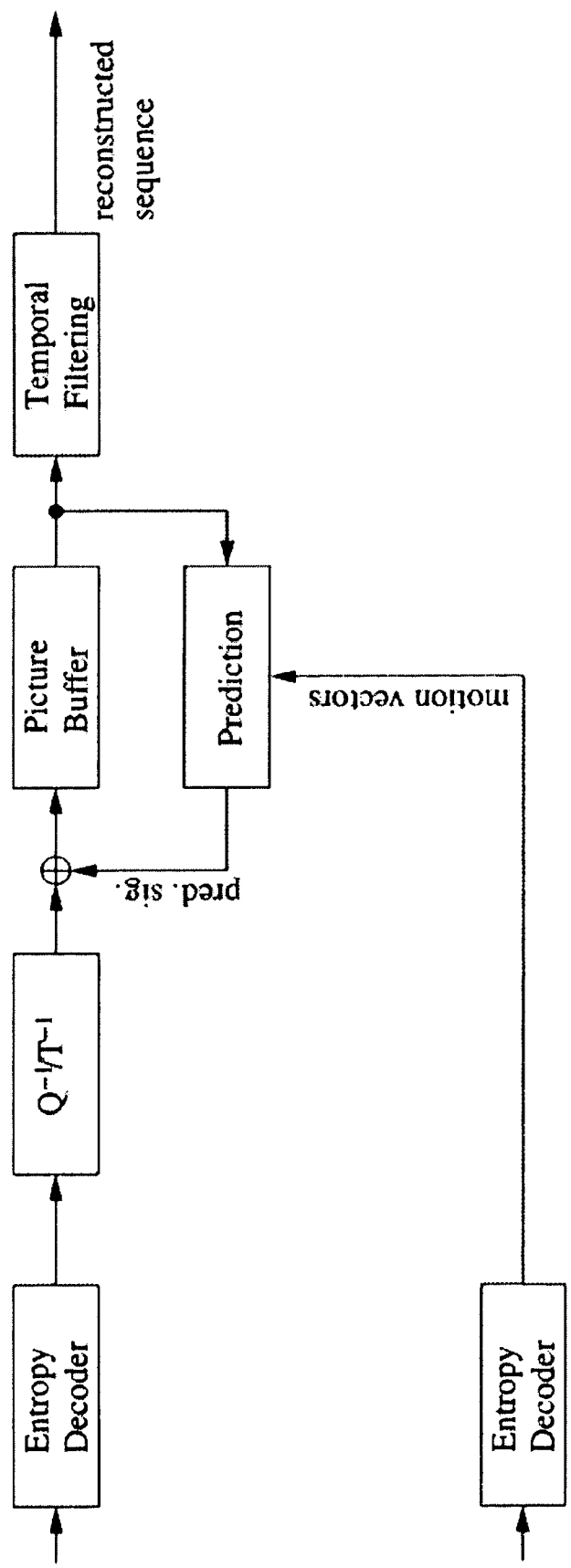

In a third preferred embodiment, the encoder and therefore the encoded bit stream stays unchanged. Temporal filtering is only performed at the decoder before displaying the video sequence to the receiver. Filtering is performed using pixel-based GME. Since no frame indices best suited for filtering are transmitted to the receiver, the approach has to either filter a predefined set of neighboring pictures or take advantage of quality metrics that do not rely on having the original picture as a reference. This embodiment is exemplified in FIG. 8. It can be extended to a multi-view coding scenario where the picture buffer is made up of spatially adjacent pictures from different views.

Figure 9A:
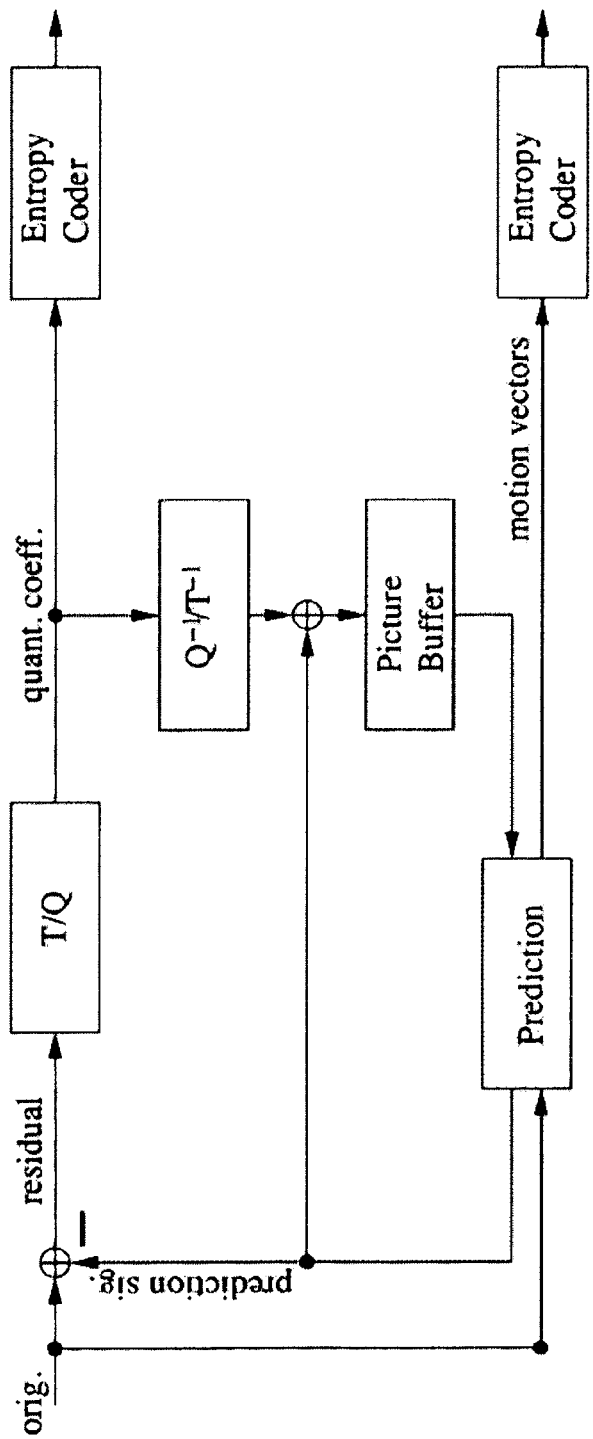
FIG. 9 shows in an exemplary fashion a temporal filtering for post-processing within a hybrid video coding environment, wherein temporal filtering is performed only at the decoder using motion vector-based GME, and wherein the frame indices used for filtering are not transmitted to the receiver, and wherein the encoder is unchanged.
Figure 9B:
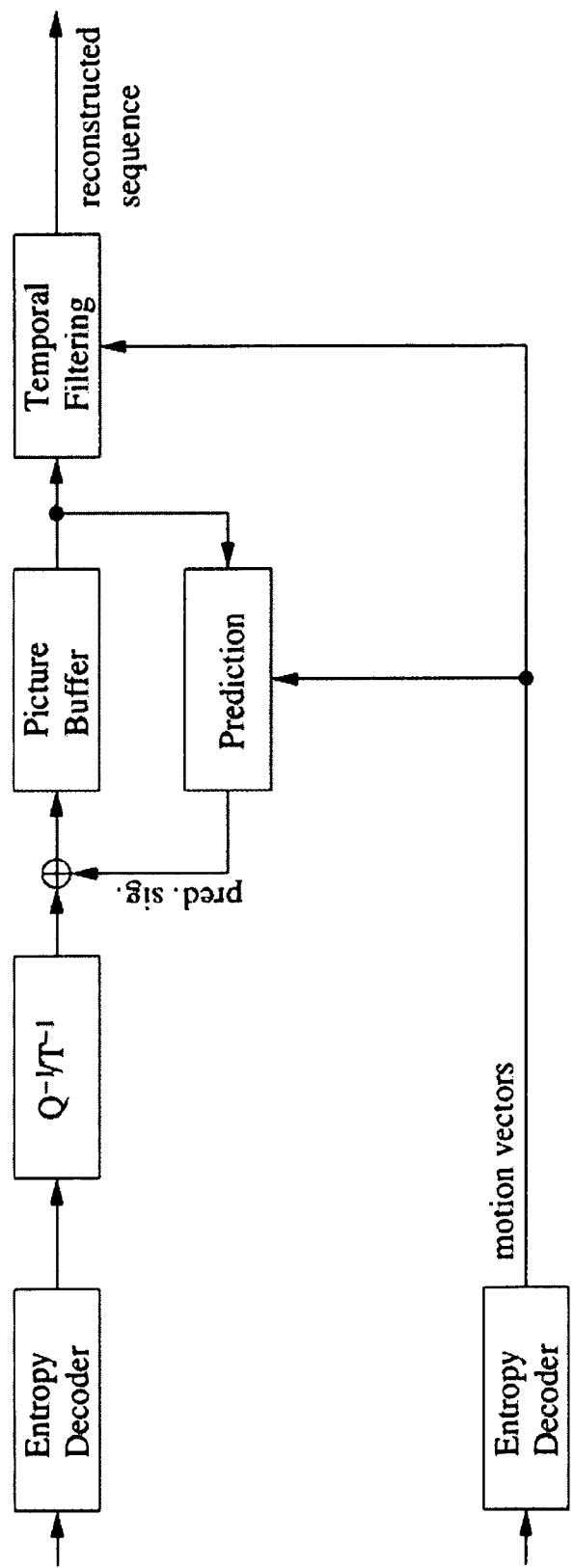

In a fourth preferred embodiment, temporal filtering is again only performed at the decoder. Other than the third preferred embodiment, it takes advantage of the motion vector field transmitted by a common video encoder for GME. This can be seen in FIG. 9. This embodiment can be extended to a multi-view coding scenario where the picture buffer is made up of spatially adjacent pictures from different views.

Figure 10A:
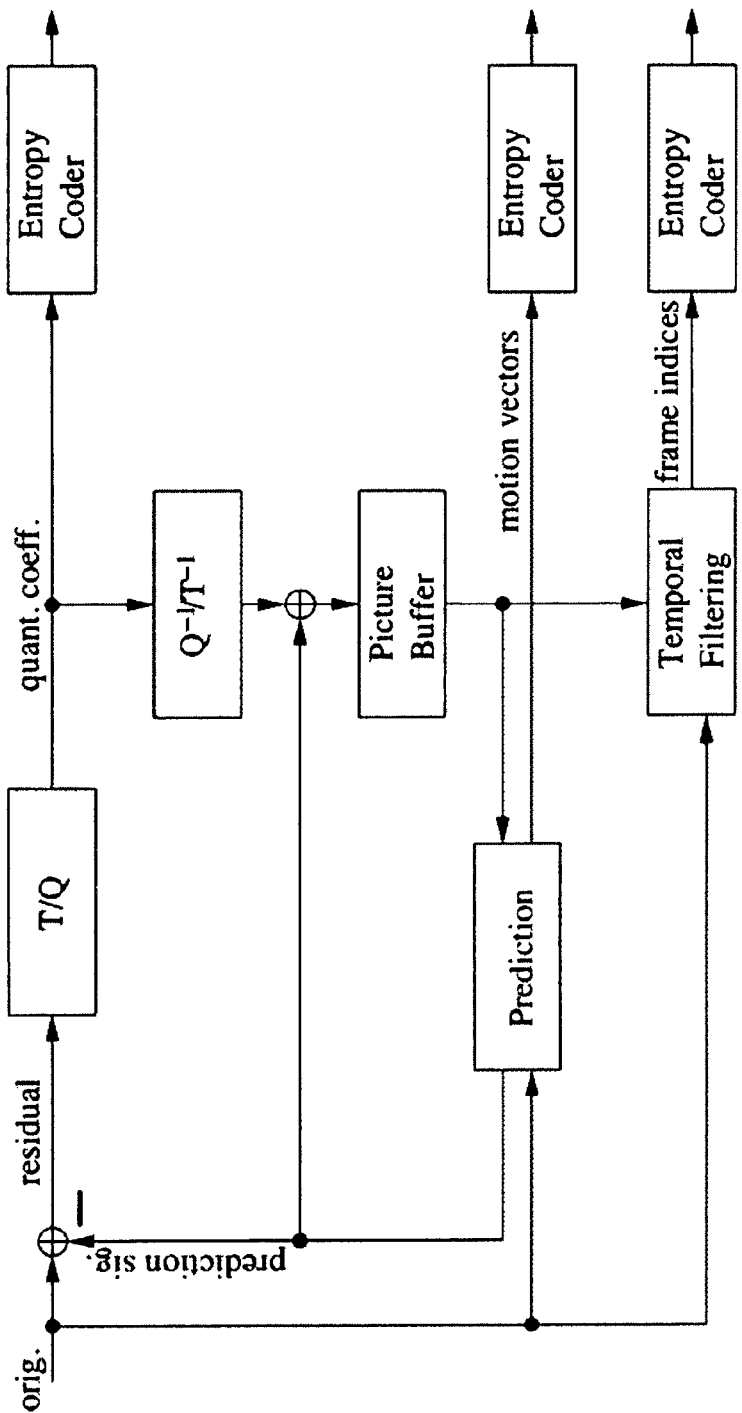
FIG. 10 shows in an exemplary fashion a temporal filtering for post-processing within a hybrid video coding environment, wherein the temporal filtering is performed both at the encoder and the decoder using pixel-based GME, and wherein no segmentation is performed, and wherein the frame indices used for filtering are transmitted to the receiver.
Figure 10B:
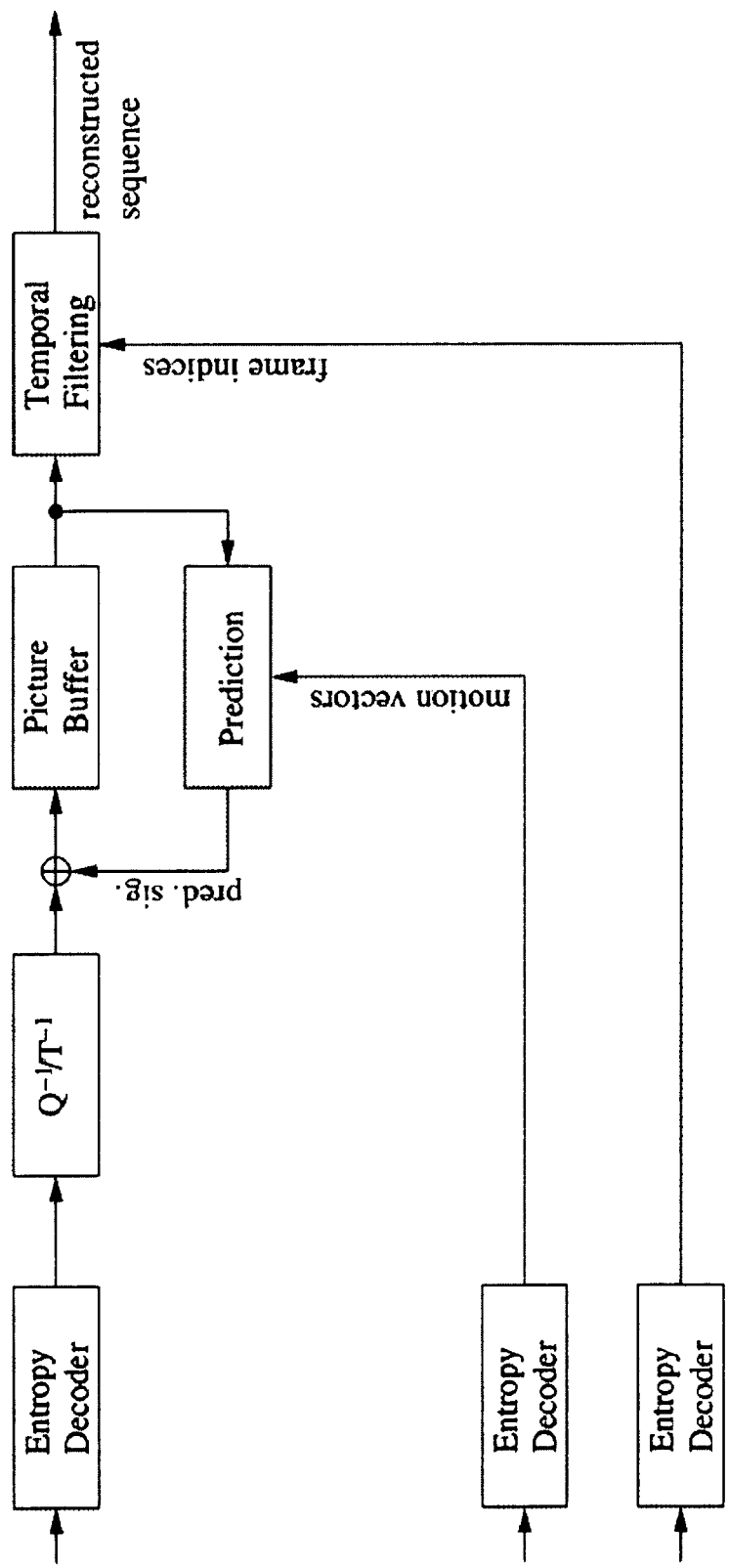

In a fifth preferred embodiment, temporal filtering is performed both at the encoder and the decoder. Other than the first two embodiments, no additional segmentation is performed and therefore, no foreground object mask is transmitted to the receiver. This approach can be seen in FIG. 10. The GME needed for temporal filtering is done using a given pixel-based approach on the pictures inside the picture buffer. This embodiment can be extended to a multi-view coding scenario where the picture buffer is made up of spatially adjacent pictures from different views.

Figure 11A:
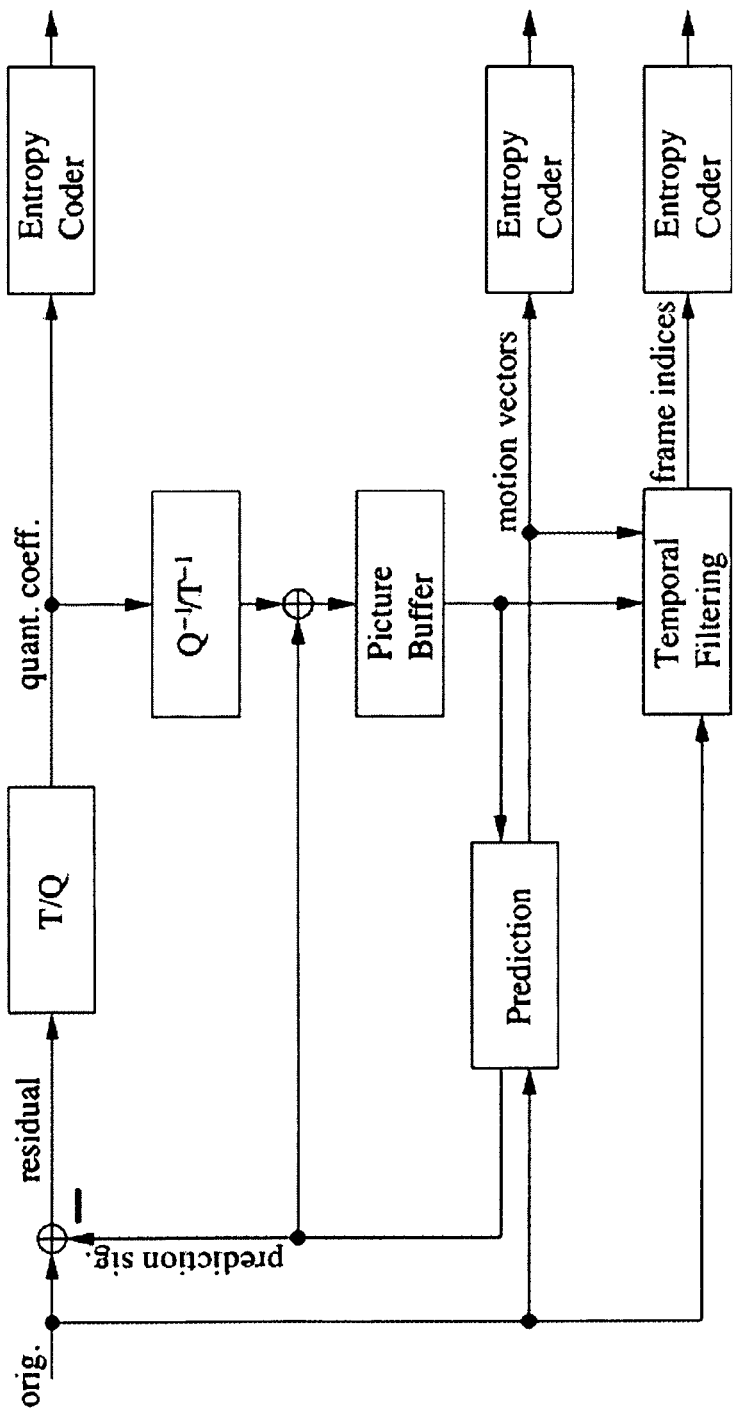
FIG. 11 shows in an exemplary fashion a temporal filtering for post-processing within a hybrid video coding environment, wherein the temporal filtering is performed both at the encoder and the decoder using motion vector-based GME, and wherein no segmentation is performed, and wherein the frame indices used for filtering are transmitted to the receiver.
Figure 11B:
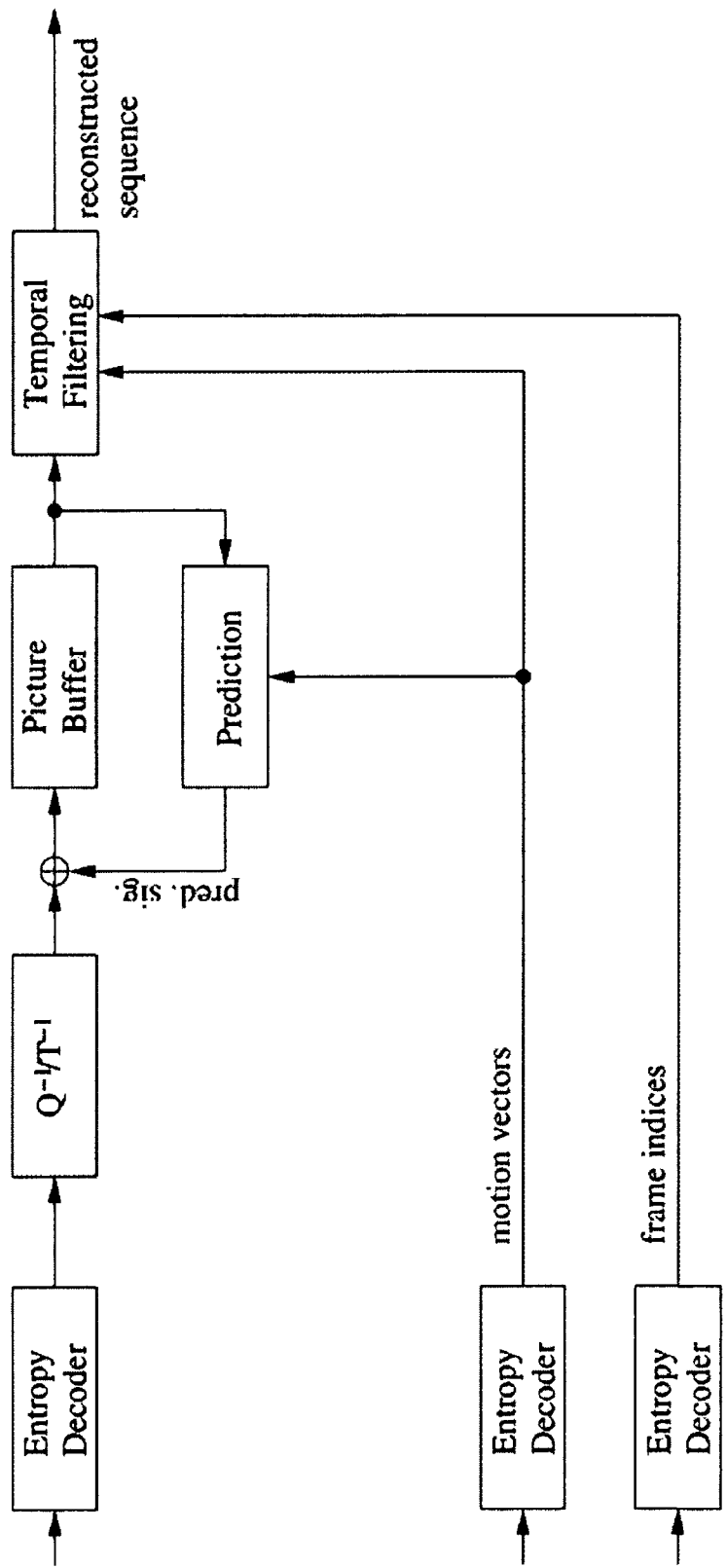

In a sixth preferred embodiment, temporal filtering is performed both at the encoder and the decoder using the motion vector field provided by motion compensated prediction for GME. See FIG. 11 for an exemplifying block diagram. No segmentation mask is generated at the encoder. Therefore, the only additional information transmitted to the receiver is a set of reference indices for filtering. This embodiment can be extended to a multi-view coding scenario where the picture buffer is made up of spatially adjacent pictures from different views.

Figure 12A:
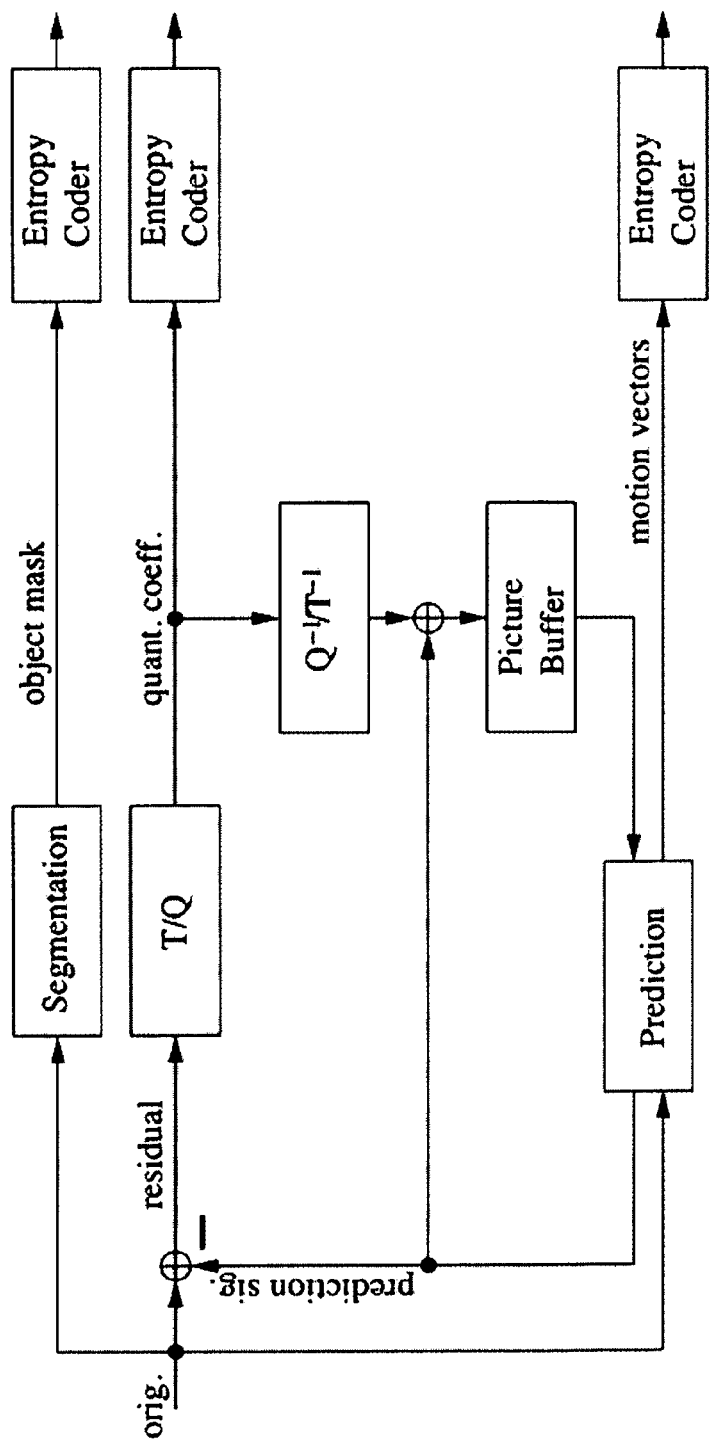
FIG. 12 shows in an exemplary fashion a temporal filtering for post-processing within a hybrid video coding environment, wherein the temporal filtering is performed only at the decoder using pixel-based GME, and wherein segmentation is performed for object mask transmission.
Figure 12B:
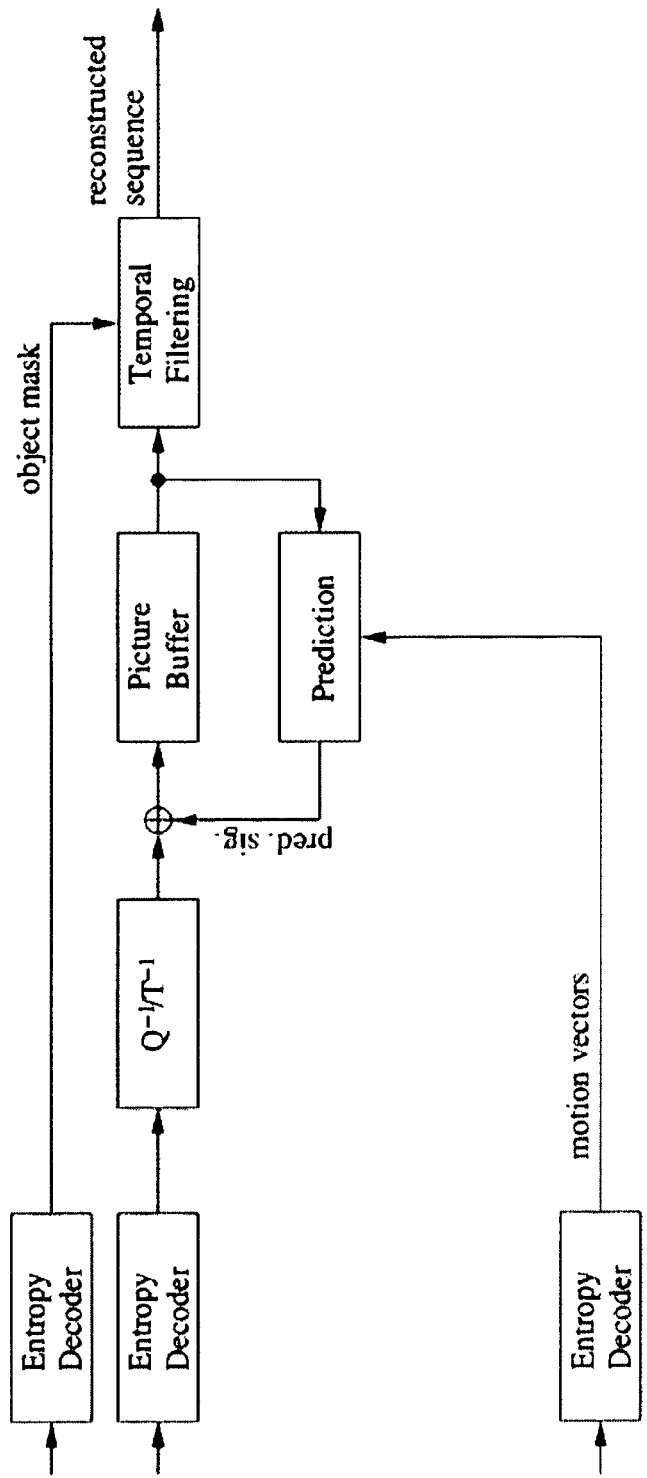

In a seventh preferred embodiment, temporal filtering for post-processing is performed only at the decoder but still, a segmentation step is done at the encoder using the original data to transmit a binary object mask to the receiver. This is exemplary depicted in FIG. 12. Here, temporal filtering is performed using only the data in the picture buffer at the decoder with a pixel-based GME approach.

Figure 13A:
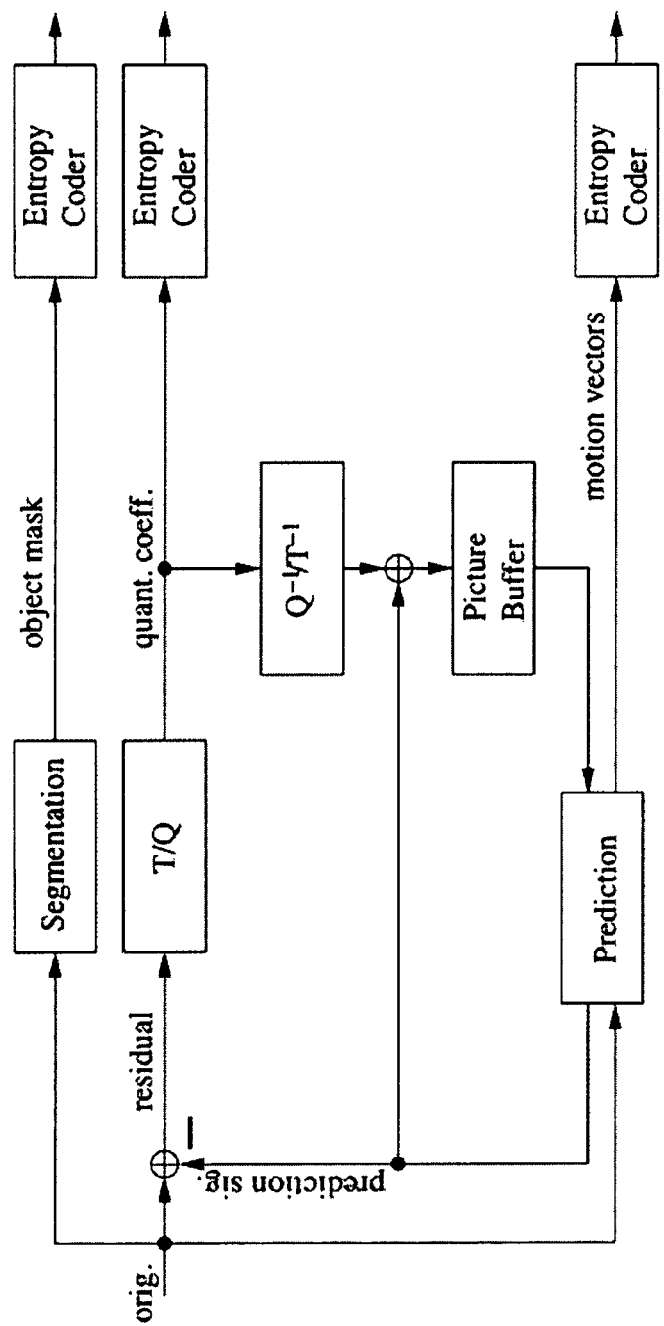
FIG. 13 shows in an exemplary fashion a temporal filtering for post-processing within a hybrid video coding environment, wherein temporal filtering is performed only at the decoder using motion vector-based GME, and wherein segmentation is performed for object mask transmission.
Figure 13B:
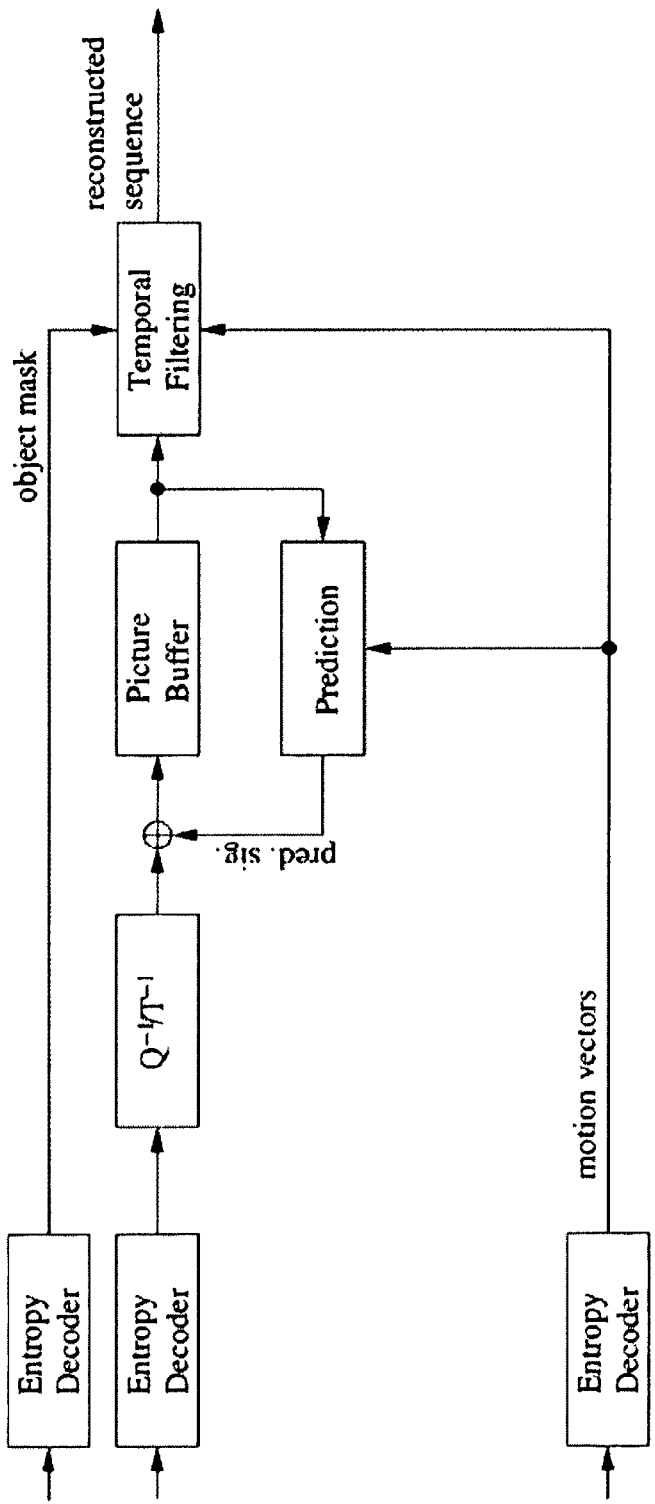

The eighth preferred embodiment is an extension to the seventh embodiment. It is shown in FIG. 13 and differs only in the computation of the temporally filtered sequence, i.e. it uses the motion vector field provided by the common bitstream.

Prediction 1—Motion Estimation Enhancement

Figure 14A:
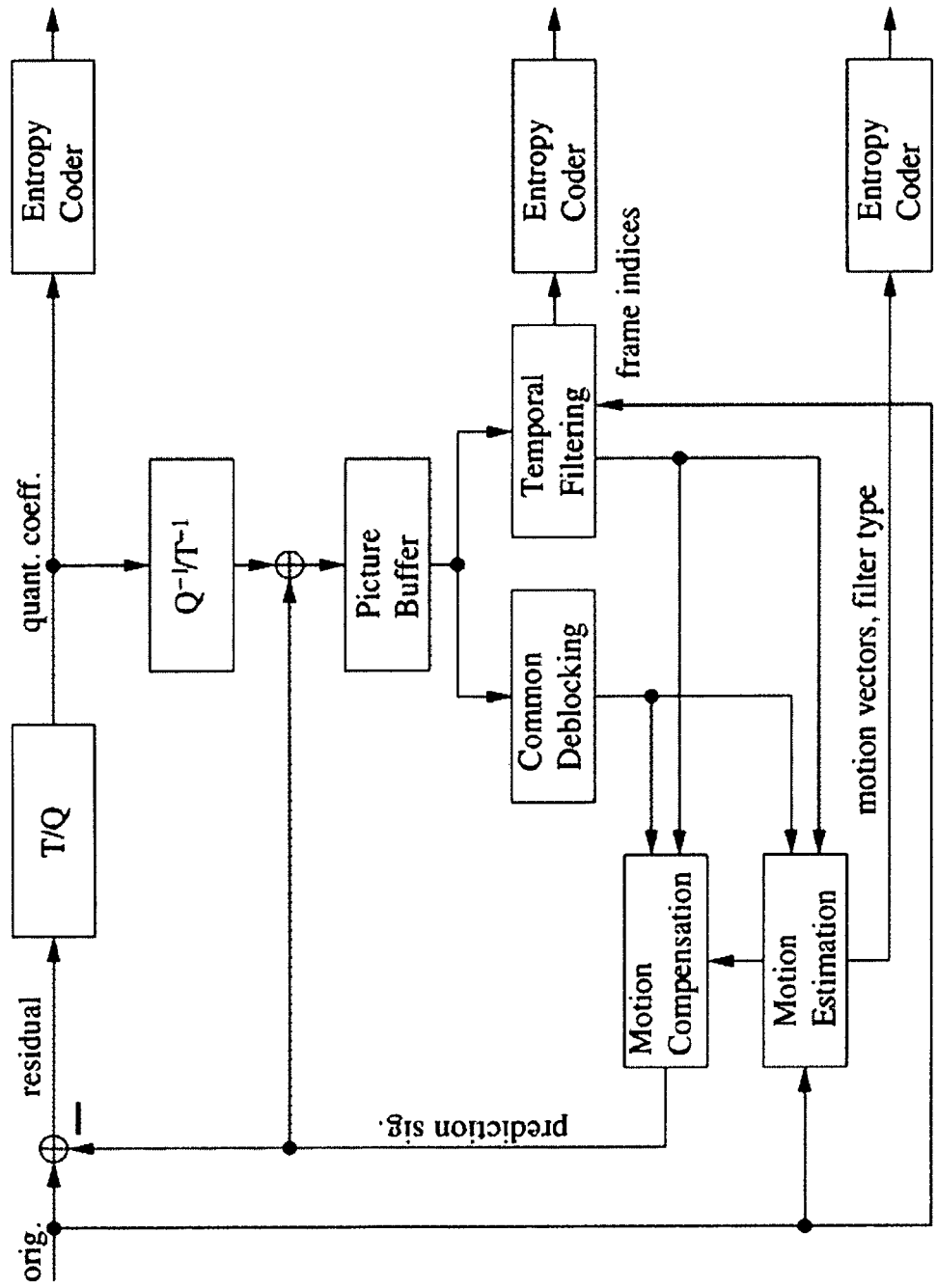
FIG. 14 shows in an exemplary fashion a temporal filtering for motion estimation enhancement within a hybrid video coding environment, wherein the temporal filtering is performed using pixel-based GME on the pictures inside the picture buffer besides common spatial deblocking, and wherein the encoder decides whether to used spatial deblocking or temporal filtering by minimizing the prediction error.
Figure 14B:
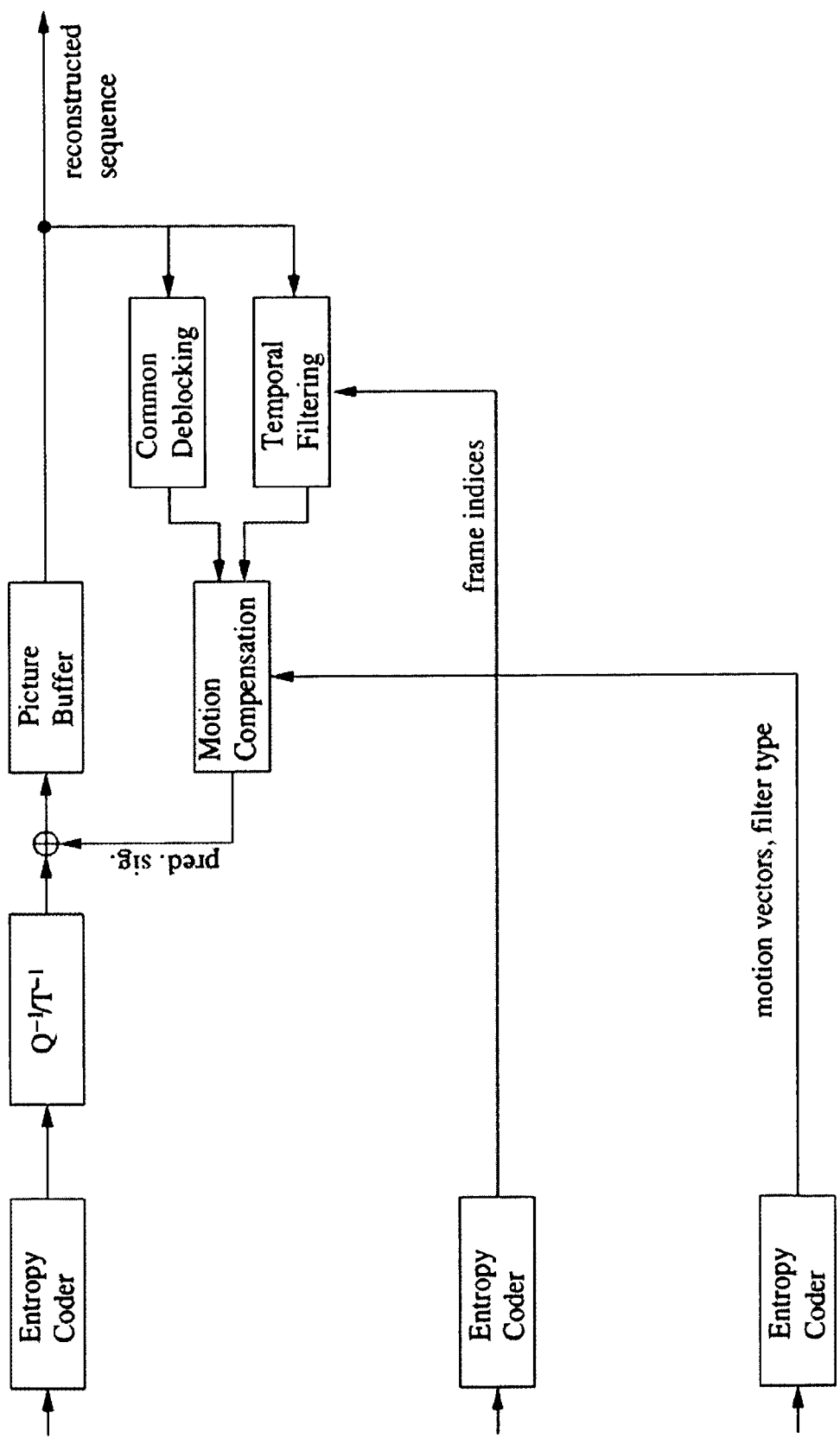

Other than the embodiments described above, the global motion temporal filtering approach can also be used for prediction directly. FIG. 14 shows a ninth preferred embodiment of the new technique incorporated into the prediction loop of a common hybrid video coding environment. For simplicity, prediction modes other than inter prediction have been omitted.

Common deblocking filters are embedded into the prediction loop as a preprocessing step for MCP due to their capability of reducing blocking artifacts. These artifacts do not only affect the perceived visual quality but also impair the results of motion estimation. State-of-the-art deblocking filters perform well but blocking artifacts are still visible. Therefore, the global motion temporal filtering approach is used besides the common H.264/AVC deblocking filter.

Independent of the approach used, filtering is always performed on the reference for MCP. In the case of global motion temporal filtering, transformation of temporally or spatially adjacent pictures from the picture buffer is performed before blending and quality evaluation take place. Other than the embodiments from above, the filtered picture has to be stored for a short time. This is due to the fact that filtered representations have to be available as references for motion estimation.

Figure 15:
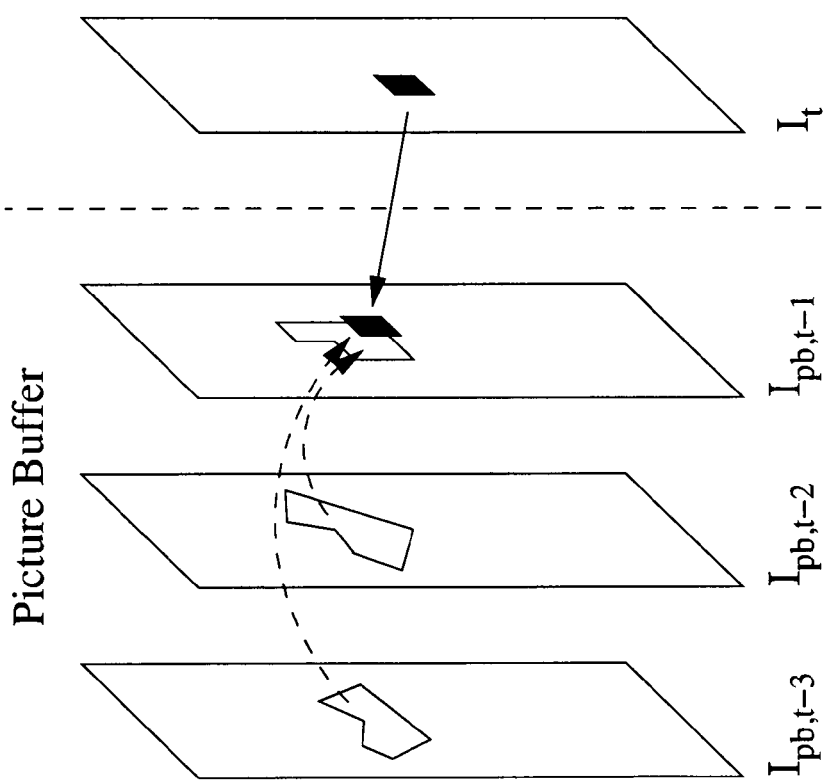
FIG. 15 shows an example for the generation of a filtered reference picture $I_{pb,t-1,filtered}$ for block-based motion estimation, wherein the pictures inside the picture buffer can be past and/or future pictures of the sequence as well as pictures from different views in a multi-view coding environment.

FIG. 15 shows the exemplary transformation process of pictures from the picture buffer into the coordinate system of the reference for MCP. The current picture $I_t$ is to be encoded using inter prediction. Therefore, its reference $I_{pb,t-1}$ shall be used for finding block correspondences using motion estimation. Assuming the reference contains blocking artifacts, these artifacts can be reduced by using the global motion temporal filtering approach. The regions that are subject to filtering from the temporal neighbors $I_{pb,t-2}$ and $I_{pb,t-3}$ are therefore transformed into the reference's coordinate system. As mentioned in Section 3.1, the long-term motion between the pictures involved in the process of motion compensation has to be known. Thus, GME is incorporated into the approach as well. The transformation process creates an image stack of spatially aligned pictures.

Figure 16:
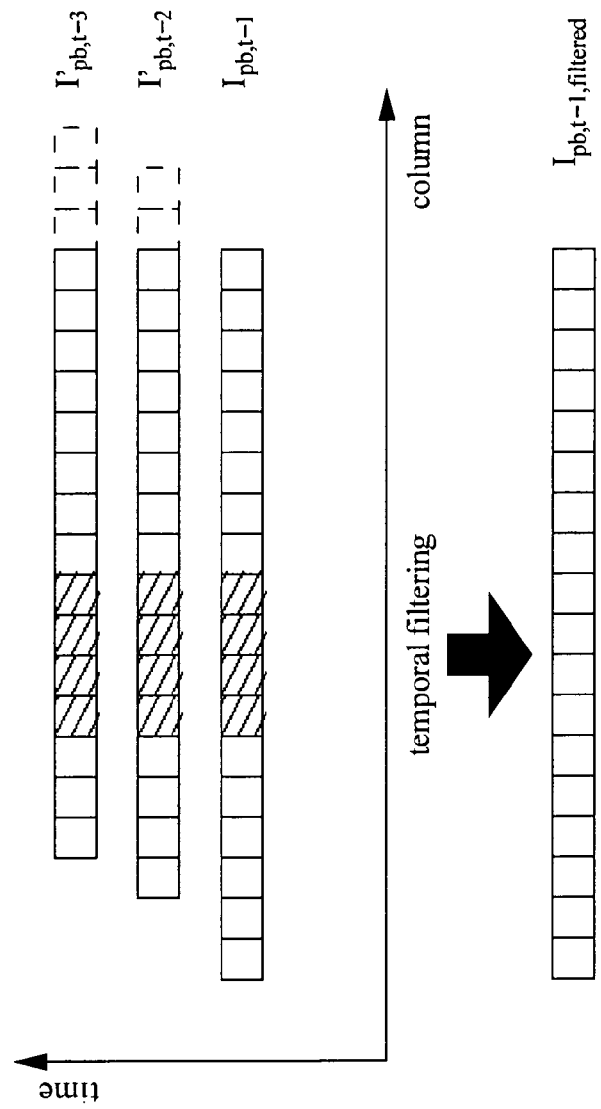
FIG. 16 shows in an exemplary fashion a temporal filtering process for the generation of a filtered reference picture $I_{pb,t-1,filtered}$ in block-based motion estimation, and wherein one line $y_k$ from a set of aligned pictures is depicted.

Part of this image stack can be seen in FIG. 16. Depicted is one line of spatially aligned pictures. The pixels inside the regions that are to be filtered are shaded. The picture $I_{pb,t-1}$, i.e. the reference for MCP, and the transformed regions from its neighbors $I'_{pb,t-2}$ and $I'_{pb,t-3}$ are blended together using a given filter on the shaded regions. Thereby, a preliminary filtered representation is generated. The representation with the highest quality in terms of e.g. PSNR or SSIM can be chosen as the final filtered picture $I_{pb,t-1,filtered}$. Therefore, a certain amount of possible subset from the picture buffer has to be tested for the filtering process.

After the best possible filtered representation of the reference is available, this is used in MCP. Motion estimation is performed block by block using both the commonly deblocked picture and the temporally filtered picture as references. An example for such a block correspondence using translational motion vectors can be seen in FIG. 15. The block from the reference that produces the smaller error is then used for motion compensation. Although foreground objects vanish from the temporally filtered pictures, it has to be stated explicitly that an additional segmentation step as described in some of the embodiments above is not needed here. This is because these areas are most likely to produce higher errors than using the commonly deblocked picture in which foreground segments do not disappear.

For sub-pel motion estimation, a super-resolution version can be generated, as is the case for all further embodiments.

Besides the common bitstream, the encoder has to transmit the number of pictures or its indices used for generation of the filtered representation to the receiver. Additionally, the filter type used for every block has to be transmitted as side information. For reconstruction of the video signal, the receiver decodes the common bitstream, filter types, and frame indices and applies common deblocking or global motion temporal filtering depending on the type of filter used for every block.

Figure 17A:
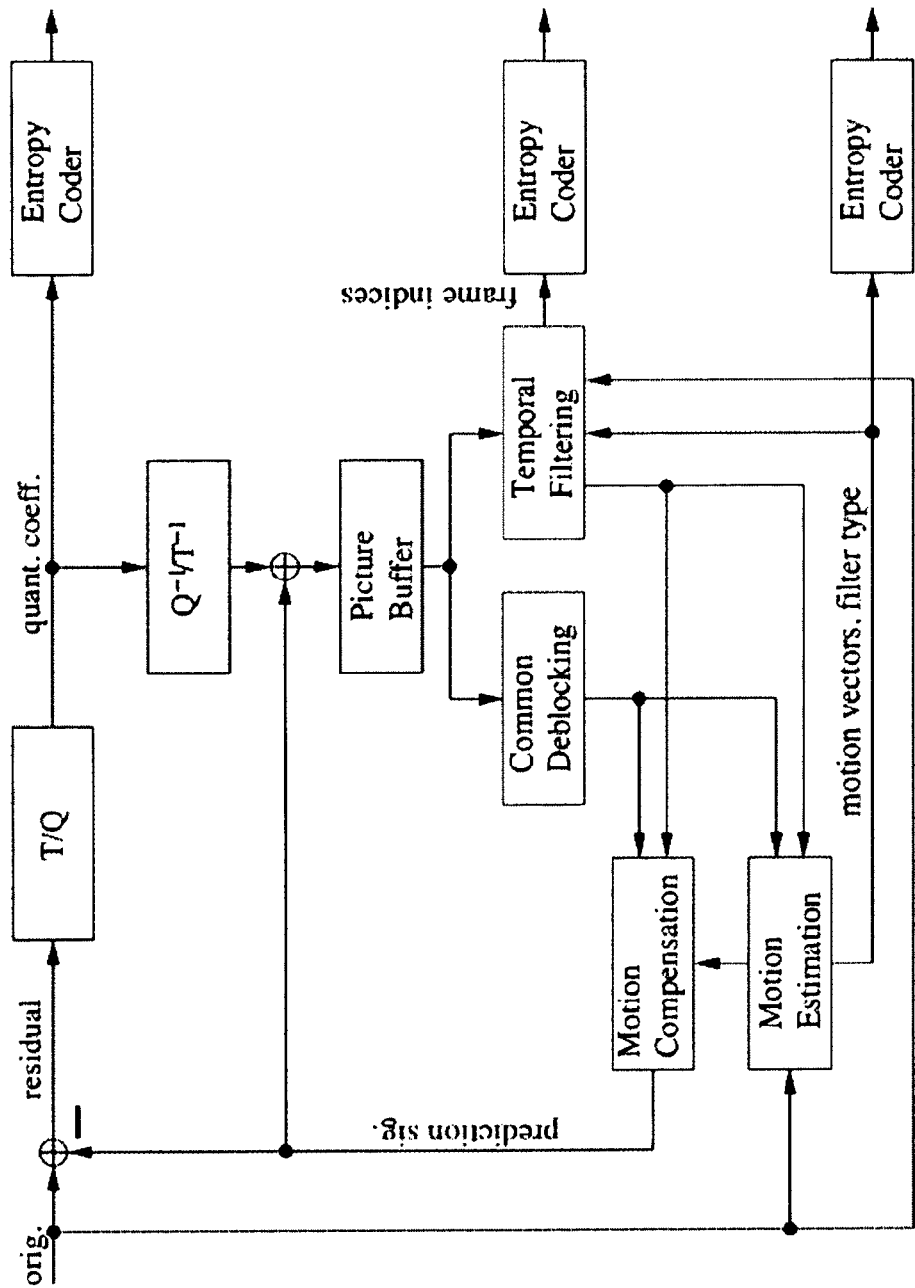
FIG. 17 shows in an exemplary fashion a temporal filtering for motion estimation enhancement within a hybrid video coding environment, wherein the temporal filtering is performed using motion vector-based GME on the pictures inside the picture buffer besides common spatial deblocking, and wherein the encoder decides whether to use spatial deblocking or temporal filtering by minimizing the prediction error.
Figure 17B:
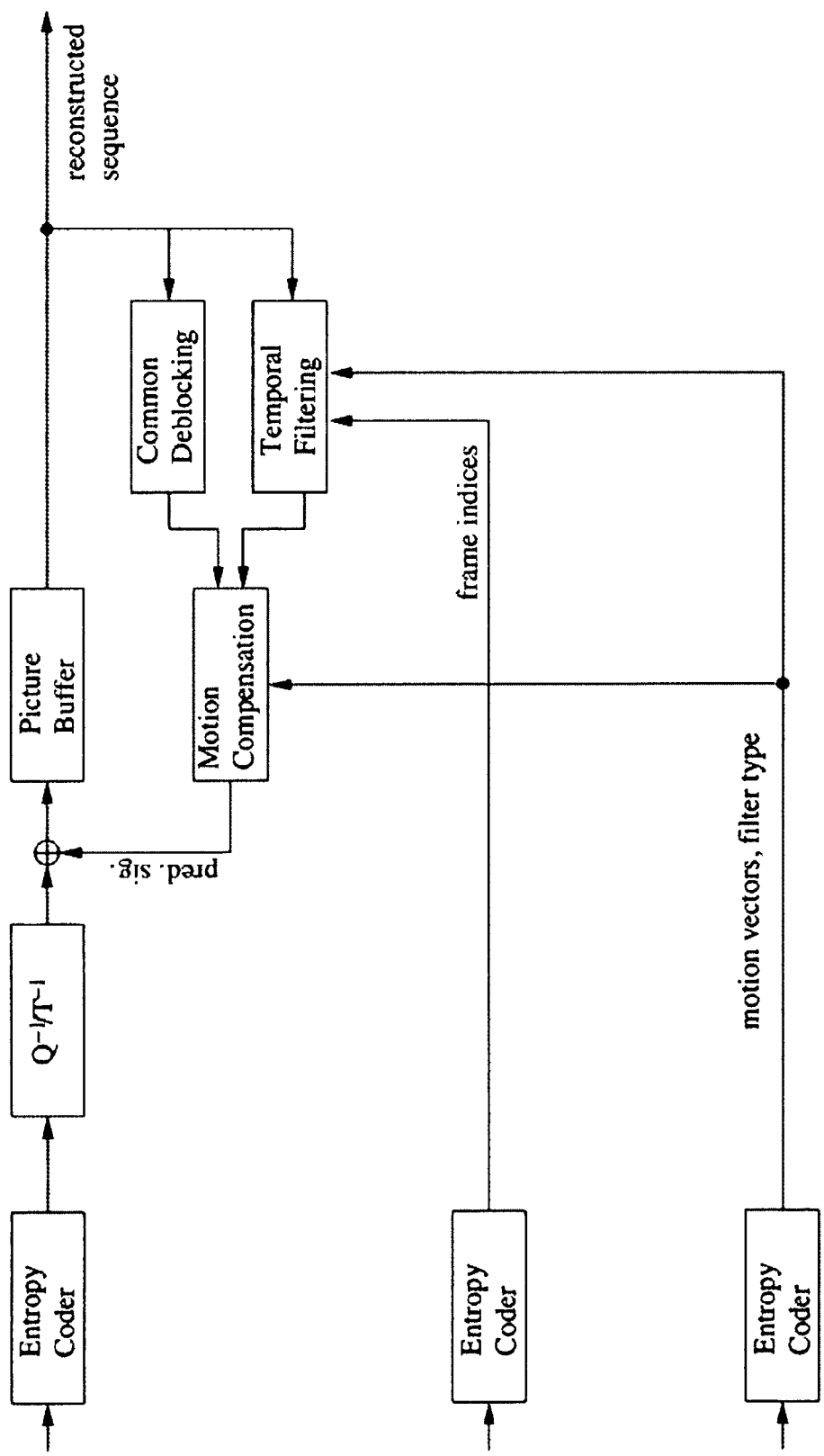

In a tenth preferred embodiment, temporal filtering is performed besides common spatial deblocking. Other than the ninth preferred embodiment, temporal filtering is performed using the motion vector fields produced by motion compensated prediction for GME. The encoder decides whether to use common spatial deblocking of temporal filtering by minimizing the prediction error. Therefore, the best possible case is used for motion estimation. This embodiment can be extended to a multi-view coding scenario where the picture buffer is made up of spatially adjacent pictures from different views. This approach can be seen in FIG. 17.

Figure 18A:
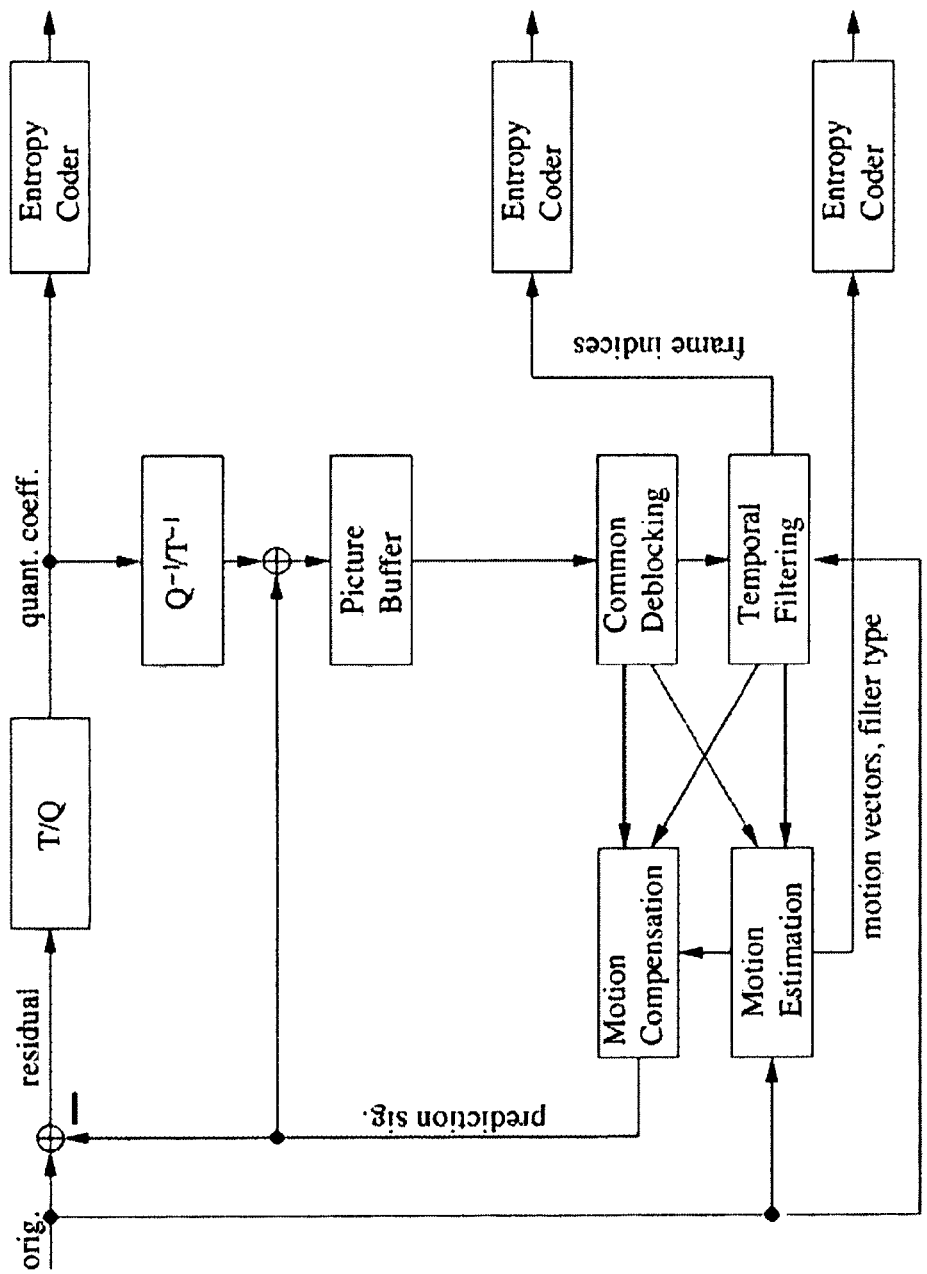
FIG. 18 shows in an exemplary fashion a temporal filtering for motion estimation enhancement within a hybrid video coding environment, wherein the temporal filtering is performed using pixel-based GME on the pictures inside the picture buffer after common spatial deblocking; and wherein the encoder decides whether to used spatial deblocking or a combination of temporal filtering and spatial deblocking by minimizing the prediction error.
Figure 18B:
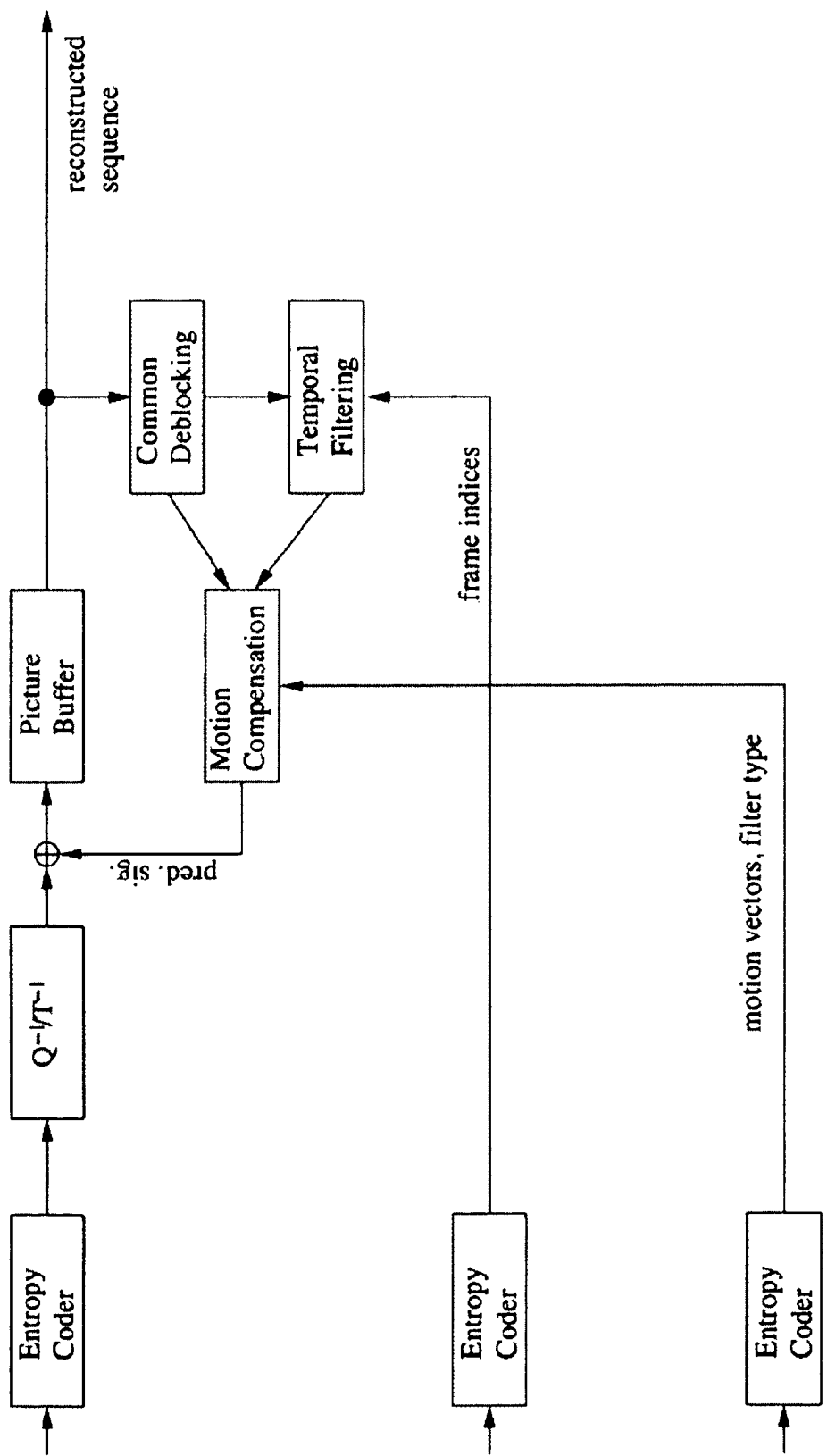

In a eleventh preferred embodiment, common spatial deblocking is performed before temporal filtering takes place. This is exemplified in the block diagram shown in FIG. 18. The encoder decides whether to use spatial deblocking or the combination of spatial deblocking and temporal filtering for motion estimation. The temporal filtering is performed using pixel-based GME on the pictures inside the picture buffer. Similar to the other embodiments in this section, the picture indices used for filtering are transmitted as side information to the receiver as well as the type of filtering used for the picture or region filtered. This embodiment can be extended to a multi-view coding scenario where the picture buffer is made up of spatially adjacent pictures from different views.

Figure 19A:
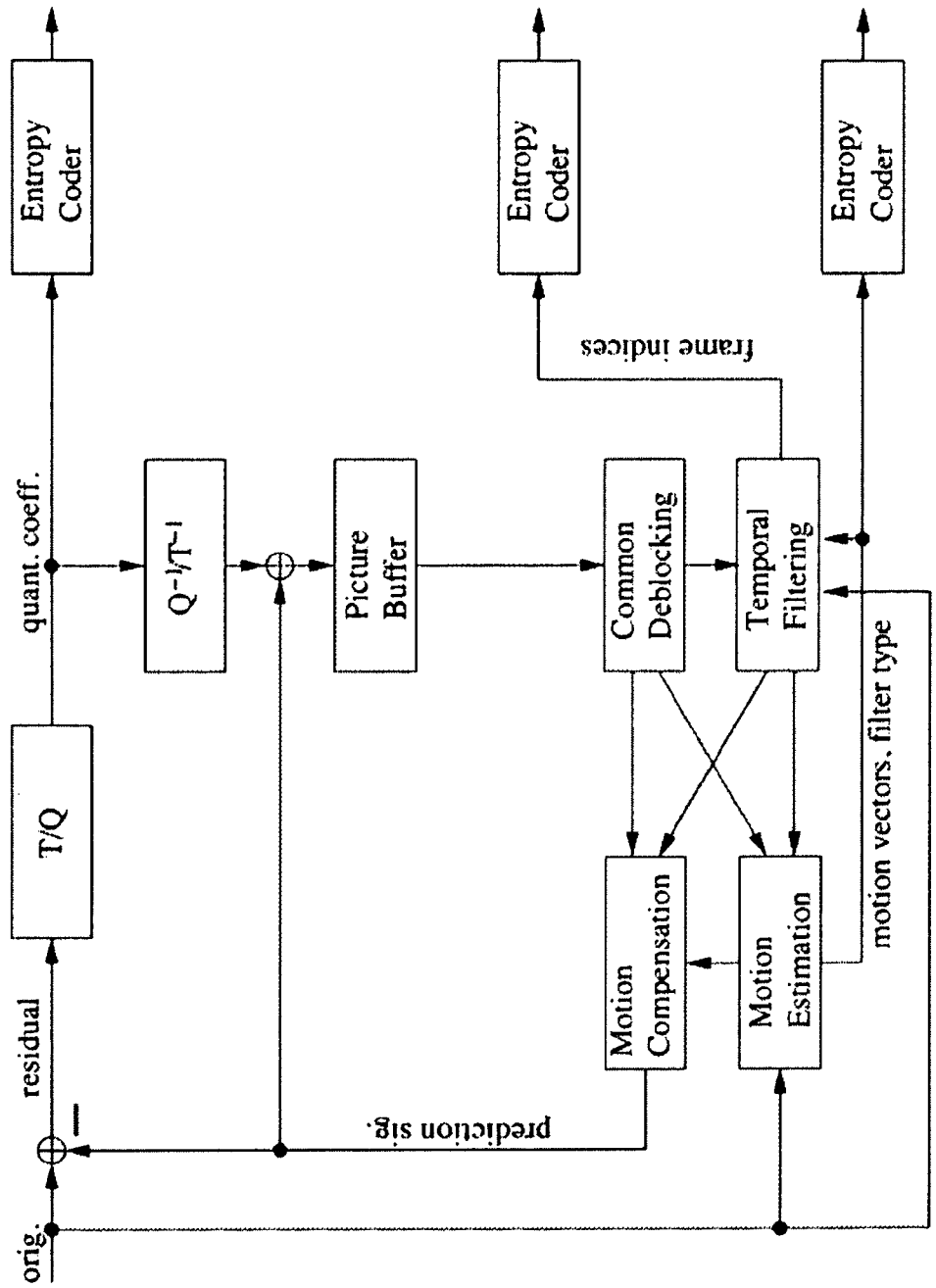
FIG. 19 shows in an exemplary fashion a temporal filtering for motion estimation enhancement within a hybrid video coding environment, wherein the temporal filtering is performed using motion vector-based GME on the pictures inside the picture buffer after common spatial deblocking, and wherein the encoder decides whether to use spatial deblocking or a combination of temporal filtering and spatial deblocking by minimizing the prediction error.
Figure 19B:
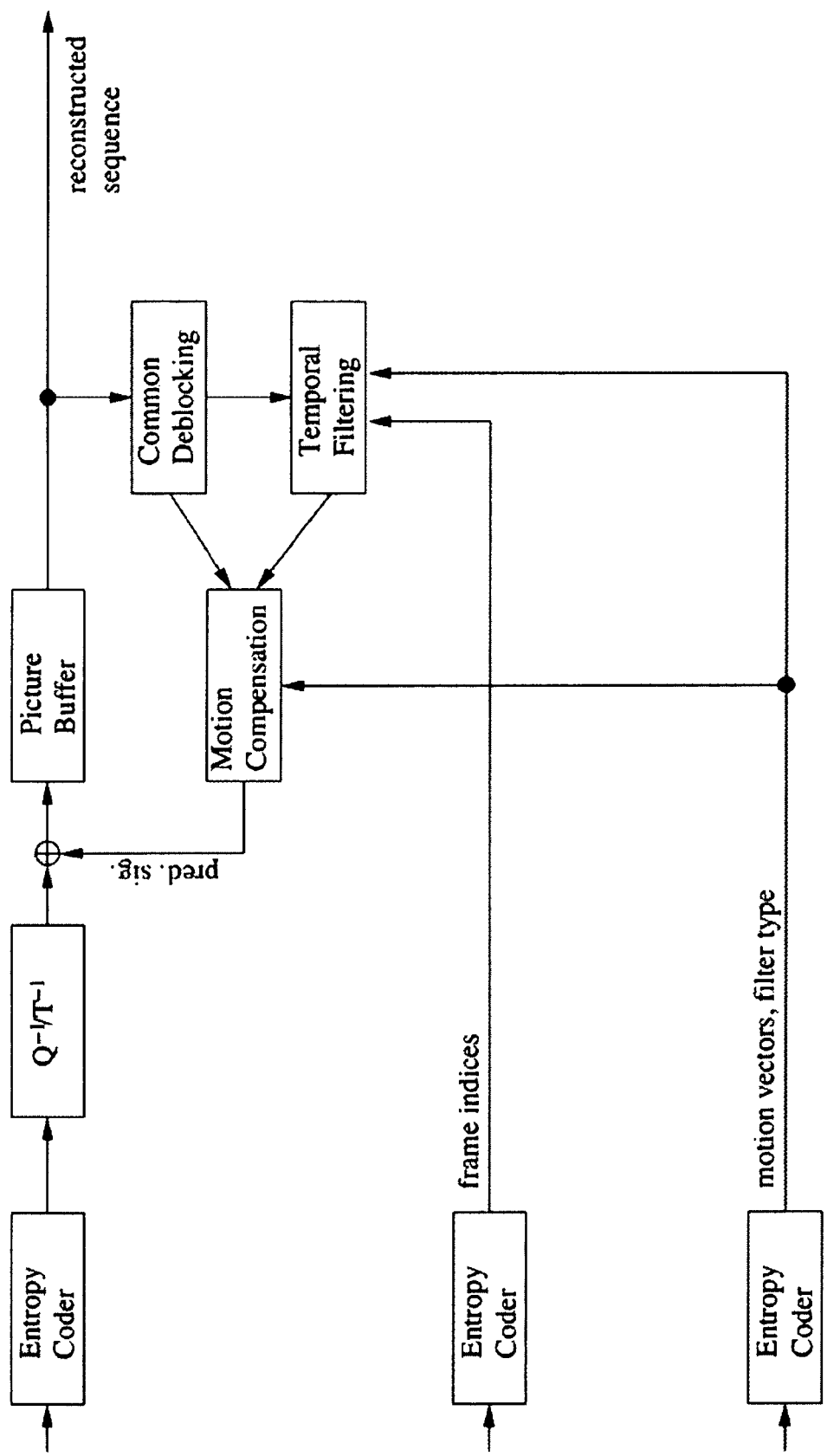
Figure 20A:
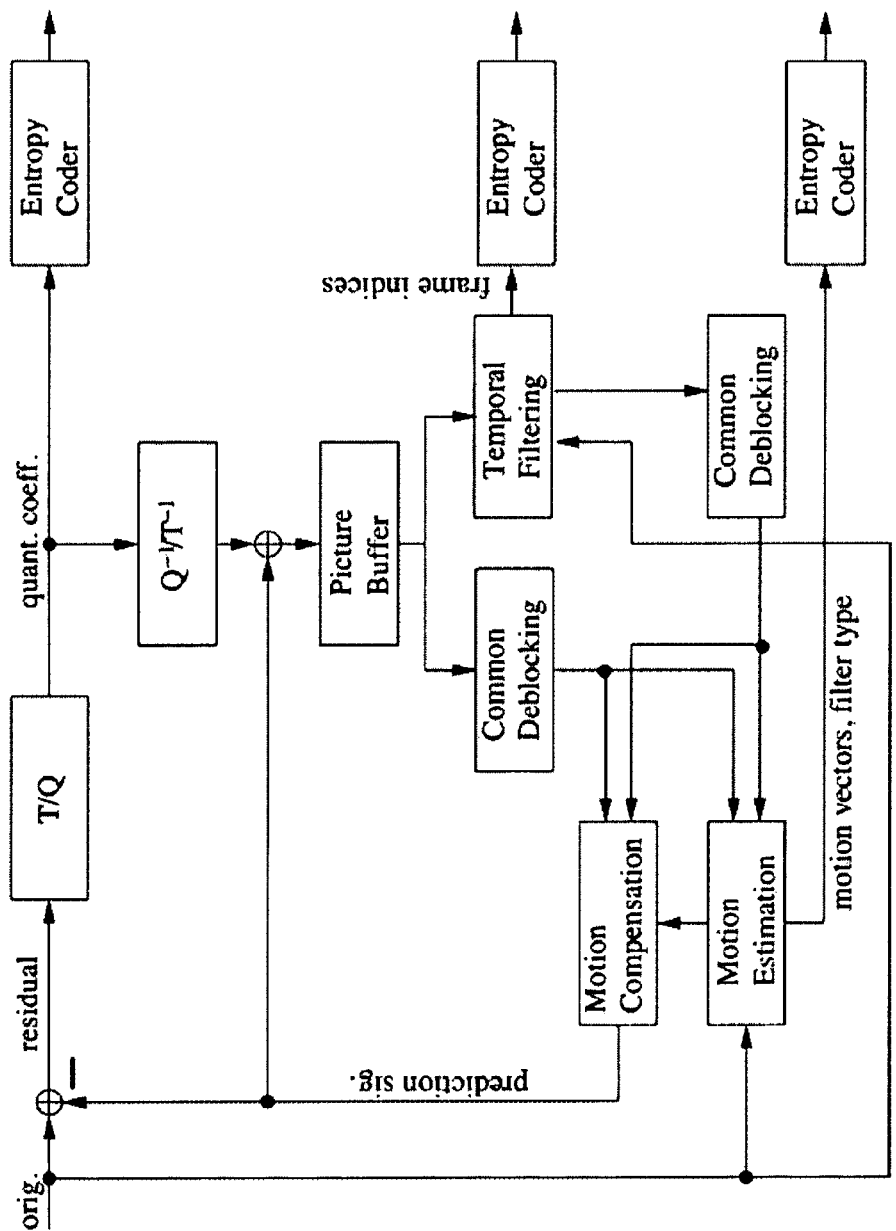
FIG. 20 shows in an exemplary fashion a temporal filtering for motion estimation enhancement within a hybrid video coding environment, wherein the temporal filtering is performed using pixel-based GME on the pictures inside the picture buffer before common spatial deblocking, and wherein the encoder decides whether to use spatial deblocking or a combination of spatial deblocking and temporal filtering by minimizing the prediction error.
Figure 20B:
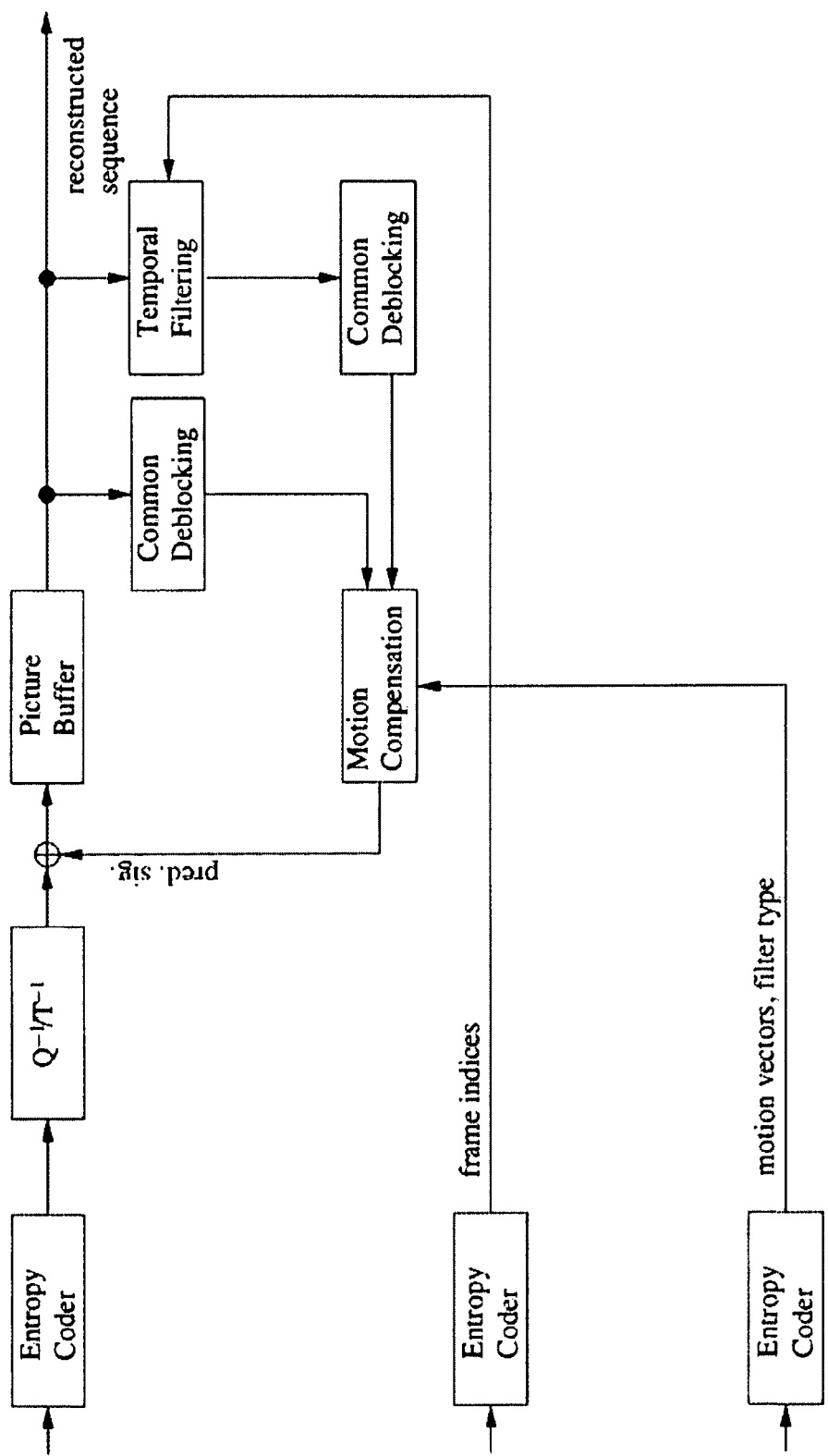
Figure 21A:
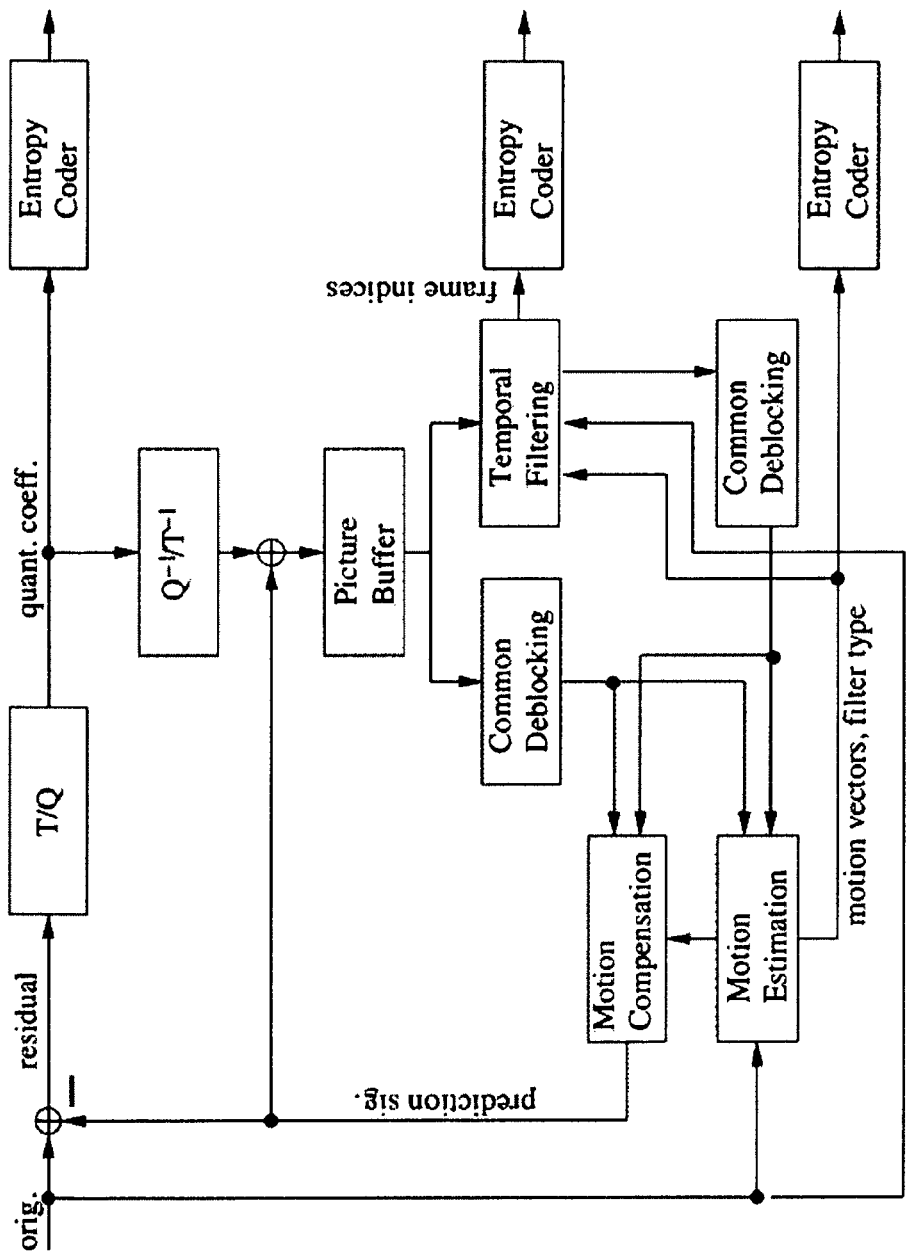
FIG. 21 shows in an exemplary fashion a temporal filtering for motion estimation enhancement within a hybrid video coding environment, wherein the temporal filtering is performed using motion vector-based GME on the pictures inside the picture buffer before common spatial deblocking, and wherein the encoder decides whether to use spatial deblocking or a combination of spatial deblocking and temporal filtering by minimizing the prediction error.
Figure 21B:
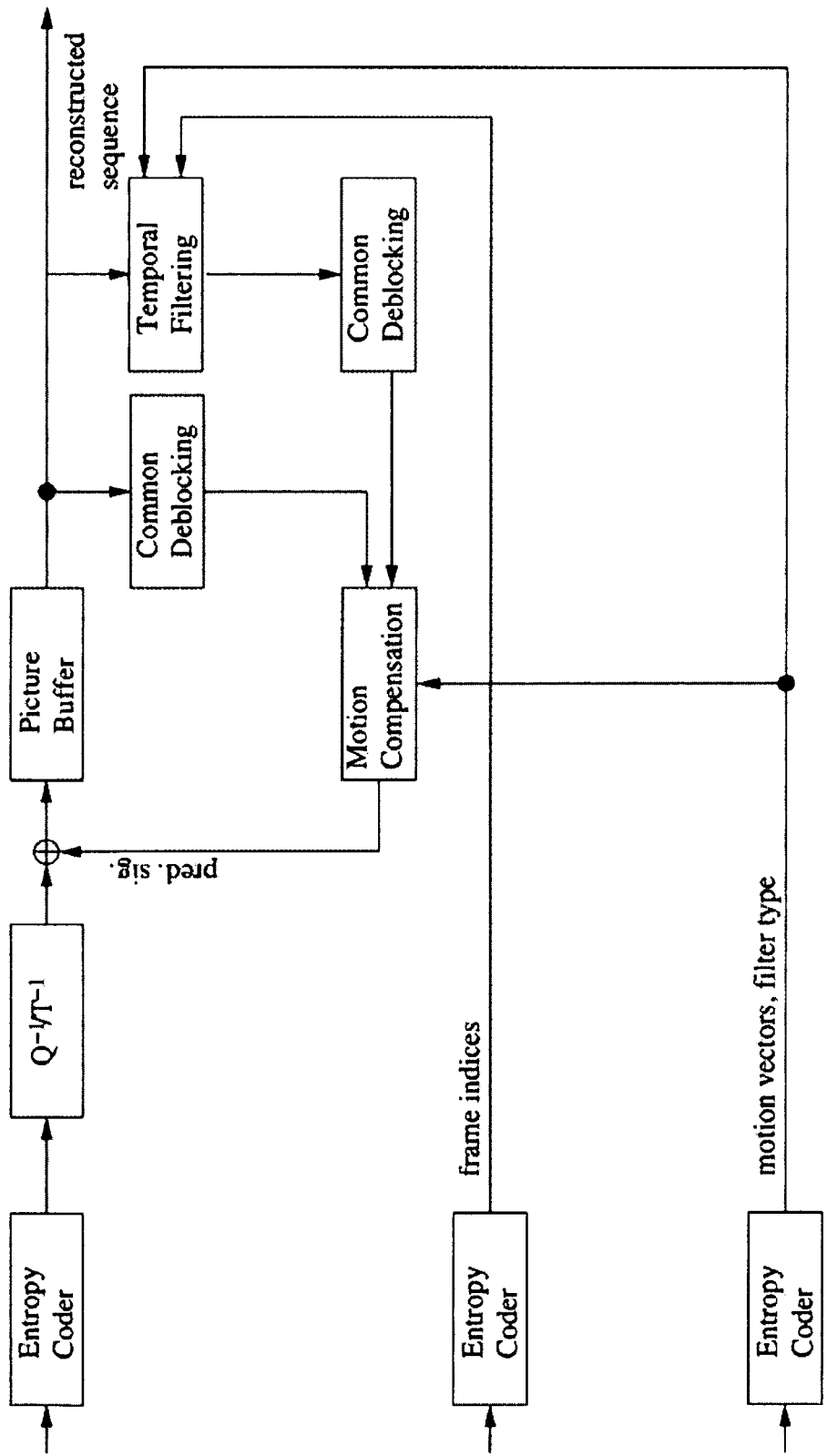

In a twelfth preferred embodiment, common spatial deblocking is performed before temporal filtering takes place. Other than the eleventh preferred embodiment, GME inside the temporal filtering is performed by utilizing the motion vector field produced by motion compensated prediction. This can be seen in FIG. 19. Again, the encoder decides on a picture or region base, the technique to be used. The frame indices are transmitted as well. This embodiment can be extended to a multi-view coding scenario where the picture buffer is made up of spatially adjacent pictures from different views.

In an thirteenth preferred embodiment, common spatial deblocking is performed besides a combination of temporal filtering and spatial deblocking. Here, the spatial deblocking is performed after temporal filtering. Temporal filtering uses a pixel-based GME approach for global motion compensation. The encoder decides what technique to use depending on the best prediction signal generated. Frame indices and techniques used for pictures and/or regions are transmitted to the receiver. This embodiment can be extended to a multi-view coding scenario where the picture buffer is made up of spatially adjacent pictures from different views.

The fourteenth preferred embodiment is an extension to the thirteenth preferred embodiment. Other than that, the motion vector fields produced by motion compensated prediction are used for GME inside the temporal filter. Again, the encoder decides whether to only use spatial deblocking or a combination of temporal filtering and spatial deblocking. Also, frame indices and the techniques used for pictures and/or regions are transmitted to the receiver. This embodiment can be extended to a multi-view coding scenario where the picture buffer is made up of spatially adjacent pictures from different views.

Prediction 2—Additional Prediction Mode

Figure 22A:
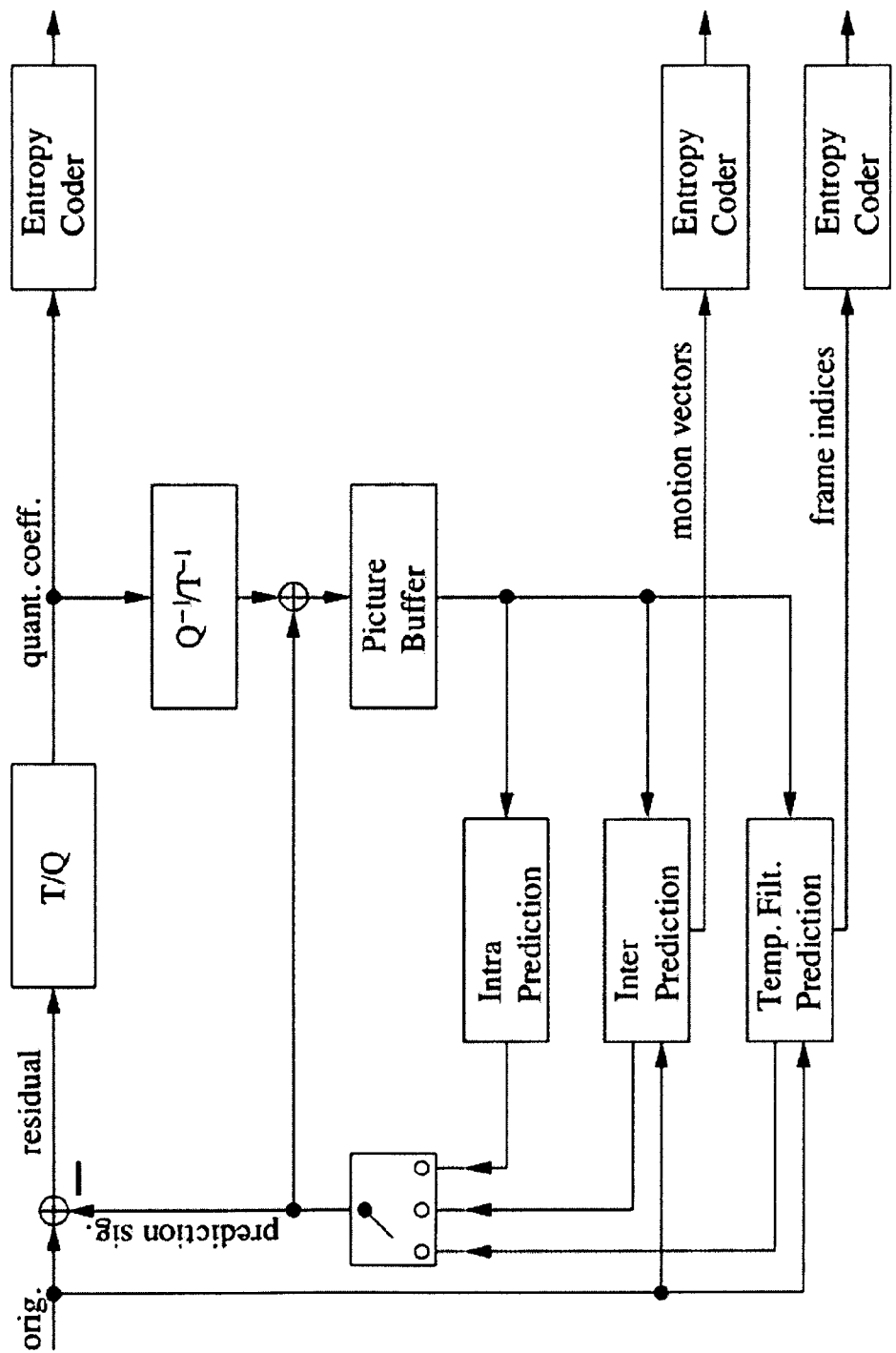
FIG. 22 shows in an exemplary fashion a temporal filtering as an additional prediction mode within a hybrid video coding environment, wherein the temporal filtering is performed using a pixel-based GME approach.
Figure 22B:
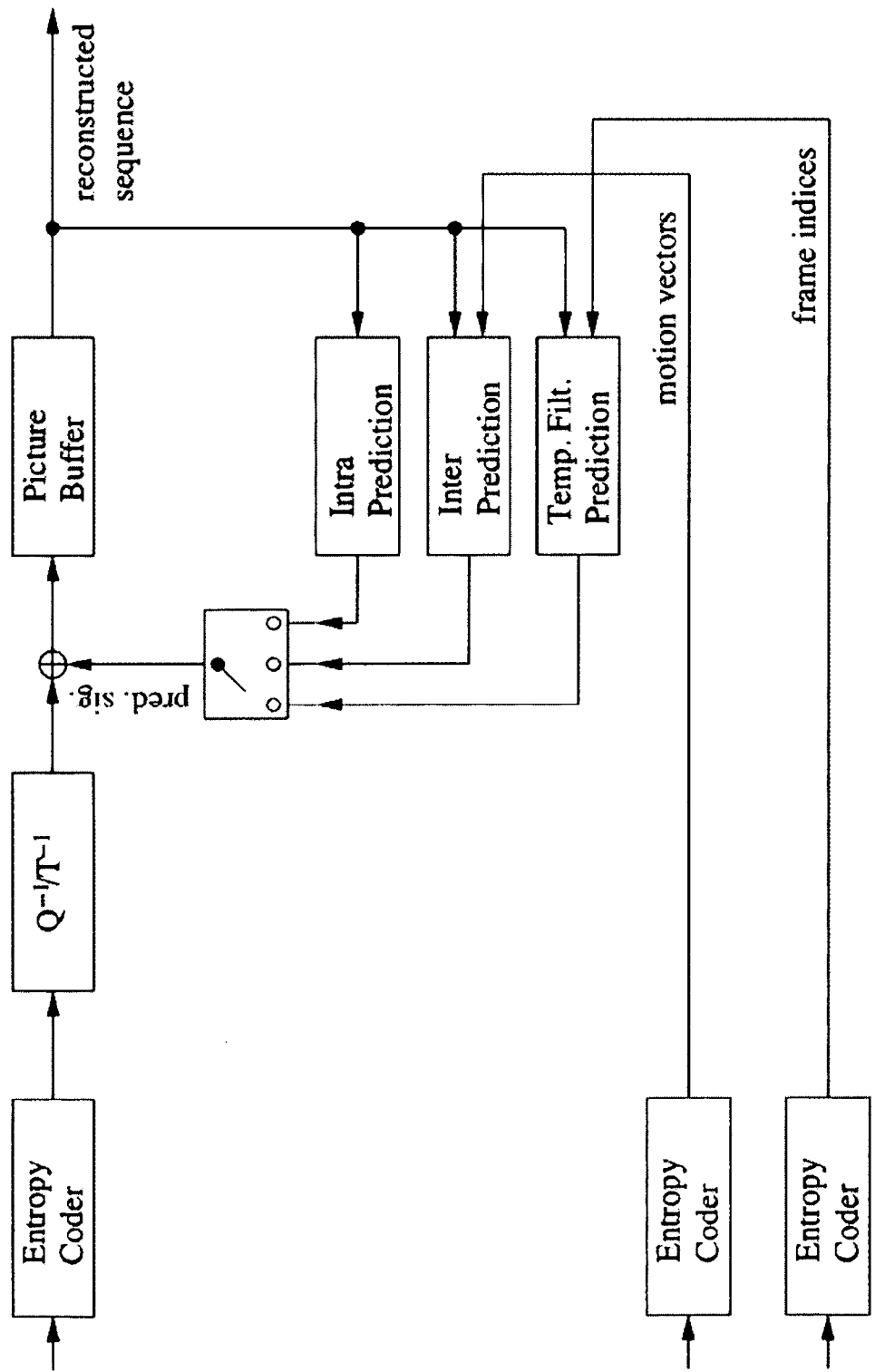

The third set of embodiments for global motion temporal filtering incorporated into a common hybrid video coding environment describes its usage as an additional prediction mode. A fifteenth preferred embodiment is depicted in FIG. 22. Information that is unimportant for this application scenario has been omitted.

Here, the approach is used as an additional prediction mode besides common intra and inter prediction. MCP in inter prediction only relies on the block matching techniques used in motion estimation. Coarser quantization of transform parameters to be transmitted leads to locally decoded pictures that contain blocking artifacts and a high amount of quantization noise. This affects the results of block matching which strongly depends on the quality of the locally decoded pictures and therefore leads to erroneous motion vector data. Furthermore, state-of-the-art block matching techniques, although accurate up to quarter-pixel level, only deliver translational motion vectors. The assumption that movement between two successive pictures can be approximated by a translational motion model may be correct in some cases but meets its limits when complex motion types like zoom, rotation, shearing and perspective transformation occur. It has to be emphasized that these problems do not affect the functionality of the coder but can lead to unnecessary high residual data after subtraction of original picture and prediction signal. This again produces an unwanted overhead of bits to transmit to the receiver.

It is possible to improve prediction significantly using global motion temporal filtering as an additional prediction mode, and therefore to reduce the prediction error, i.e. residual data. This can be achieved because a temporally filtered representation of the current picture to be encoded is built using a higher-order motion model, in this case an 8-parameter perspective motion model. Furthermore, it is built using several temporally or spatially adjacent locally decoded pictures. Depending on the level of quantization, these pictures contain blocking artifacts and quantization noise that should be reduced in the filtered picture the more of these are taken into account for its generation, and the better the estimated motion between them is.

Figure 23:
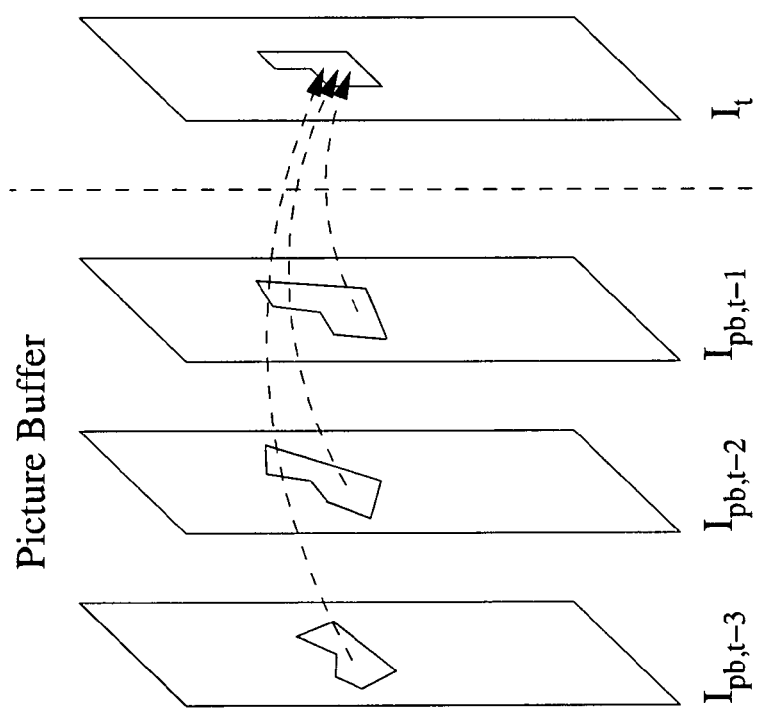
FIG. 23 shows an example for the generation of a prediction signal $I_{t,pred}$ for the current picture $I_t$, wherein the pictures inside the picture buffer can be past and/or future pictures of the sequence as well as pictures from different views in a multi-view coding environment.

FIG. 23 shows the exemplary transformation process of information from the picture buffer to build a prediction signal for the current picture. Assuming the picture currently to be encoded is $I_t$. The whole picture or just a small coherent region from it can then be predicted using the previously decoded data. In the example, some macroblocks in picture $I_t$ went through a transformation process in previous pictures. By estimating the long-term motion between the current picture and those contained in the picture buffer one can compensate for that motion. This produces an image stack of spatially aligned pictures. It has to be stated explicitly that, although picture $I_t$ is part of the global motion estimation, it must not be included in the blending process since the decoder has no knowing about it and has to reproduce the prediction signal.

Figure 24:
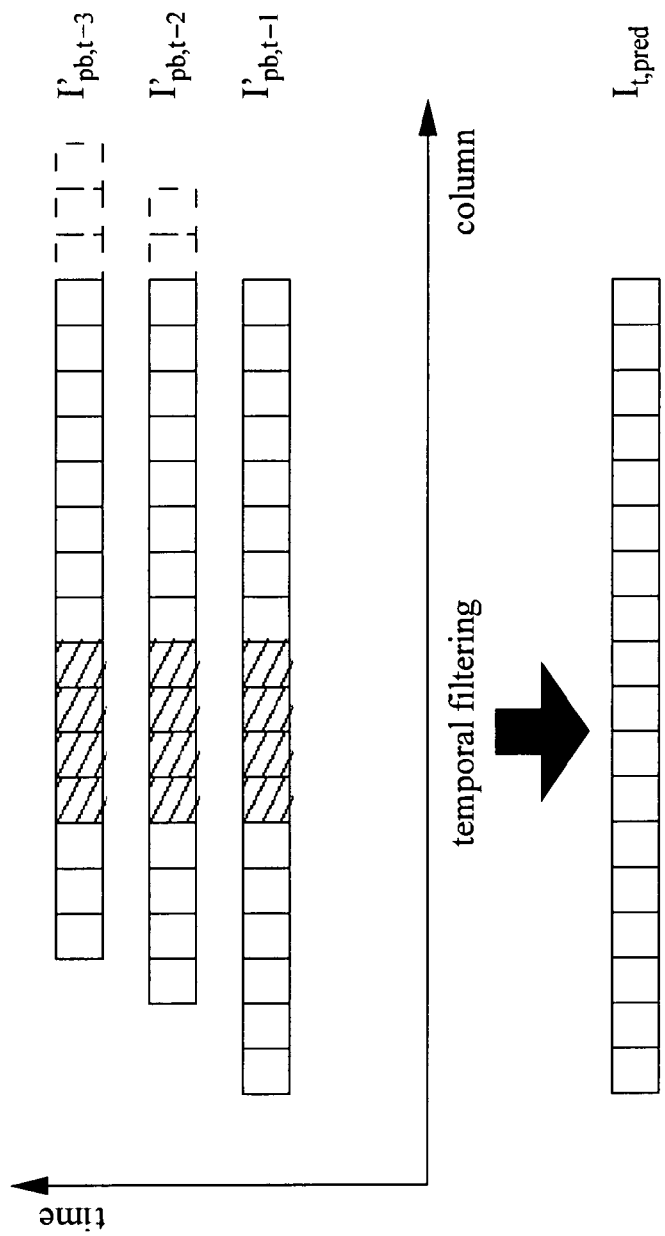
FIG. 24 shows in an exemplary fashion a temporal prediction process to form a prediction signal $I_{t,pred}$ for the current picture $I_t$, depicted is one line $y_k$ from a set of aligned pictures.

The image stack and the blending process can be seen in FIG. 24. The pictures $I_{pb,t-1}$ to $I_{pb,t-3}$ have been transformed into the coordinate system of $I_t$, becoming $I'_{pb,t-1}$ to $I'_{pb,t-3}$. The coherent region that is subject to filtering is marked as shaded pixels. The corresponding pixels are then blended together to form a prediction signal $I_{t,pred}$ for the current picture $I_t$.

All or just a subset of pictures from the picture buffer can be taken into account for generation of a prediction signal. Having built all possible preliminary representations of the current picture, these can be used to predict macroblocks from them. Since the picture buffer content is always available it is possible to use the new prediction mode in intra as well in as in inter slices and pictures, respectively. For any macroblock, all possible representations are used and the one is chosen that provides the best prediction in terms of smallest error. Besides, all common standardized prediction modes are tested and the one, which provides the smallest prediction error is chosen for further processing. If the global motion temporal filtering prediction is utilized for a macroblock, the encoder has to transmit the indices of pictures used for the prediction signal generation as side information to the receiver, besides the common bitstream. This embodiment can be extended to a multi-view coding scenario where the picture buffer is made up of spatially adjacent pictures from different views.

Figure 25A:
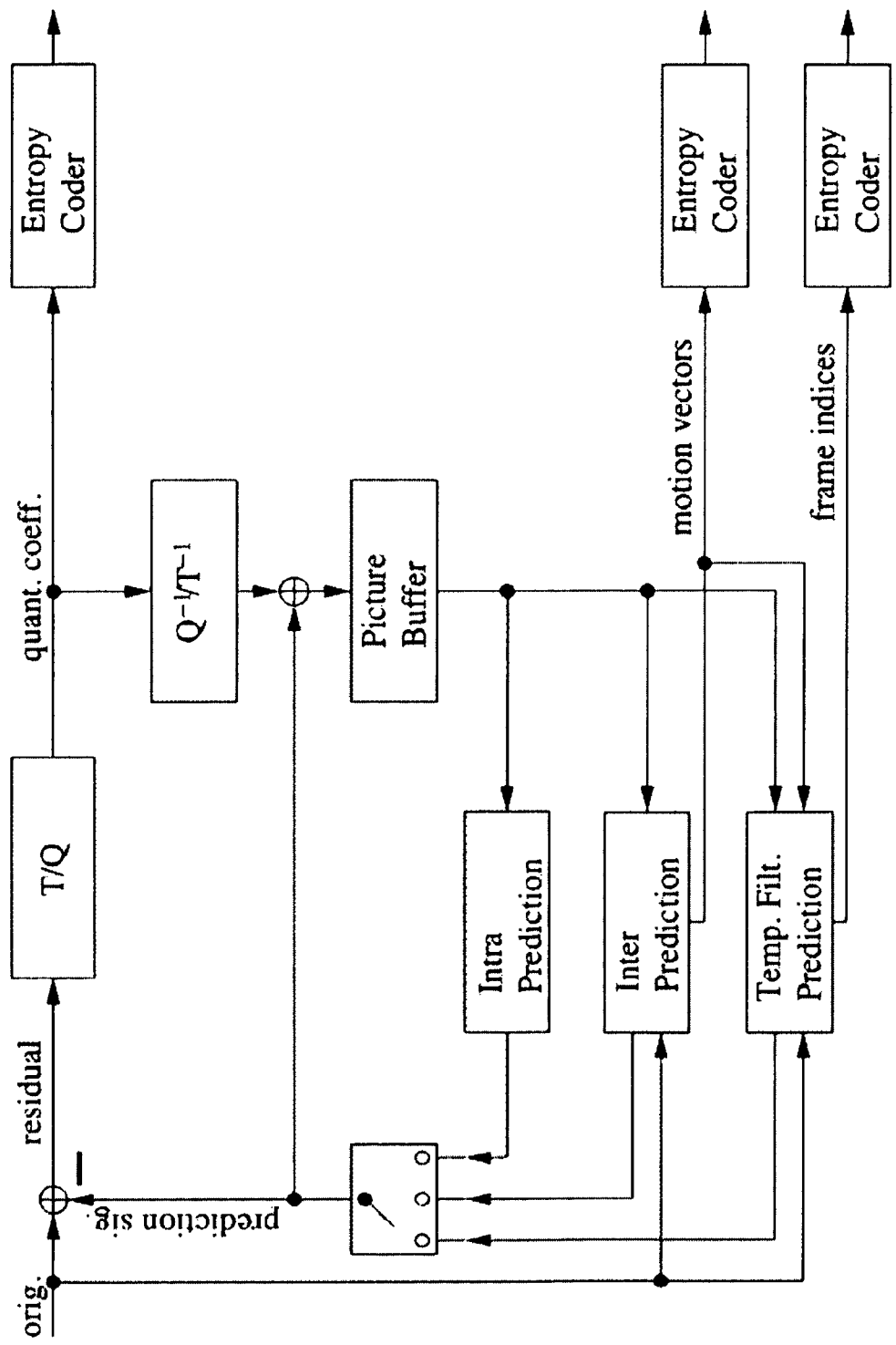
FIG. 25 shows in an exemplary fashion a temporal filtering as an additional prediction mode within a hybrid video coding environment, wherein the temporal filtering is performed using a motion vector-based GME approach.
Figure 25B:
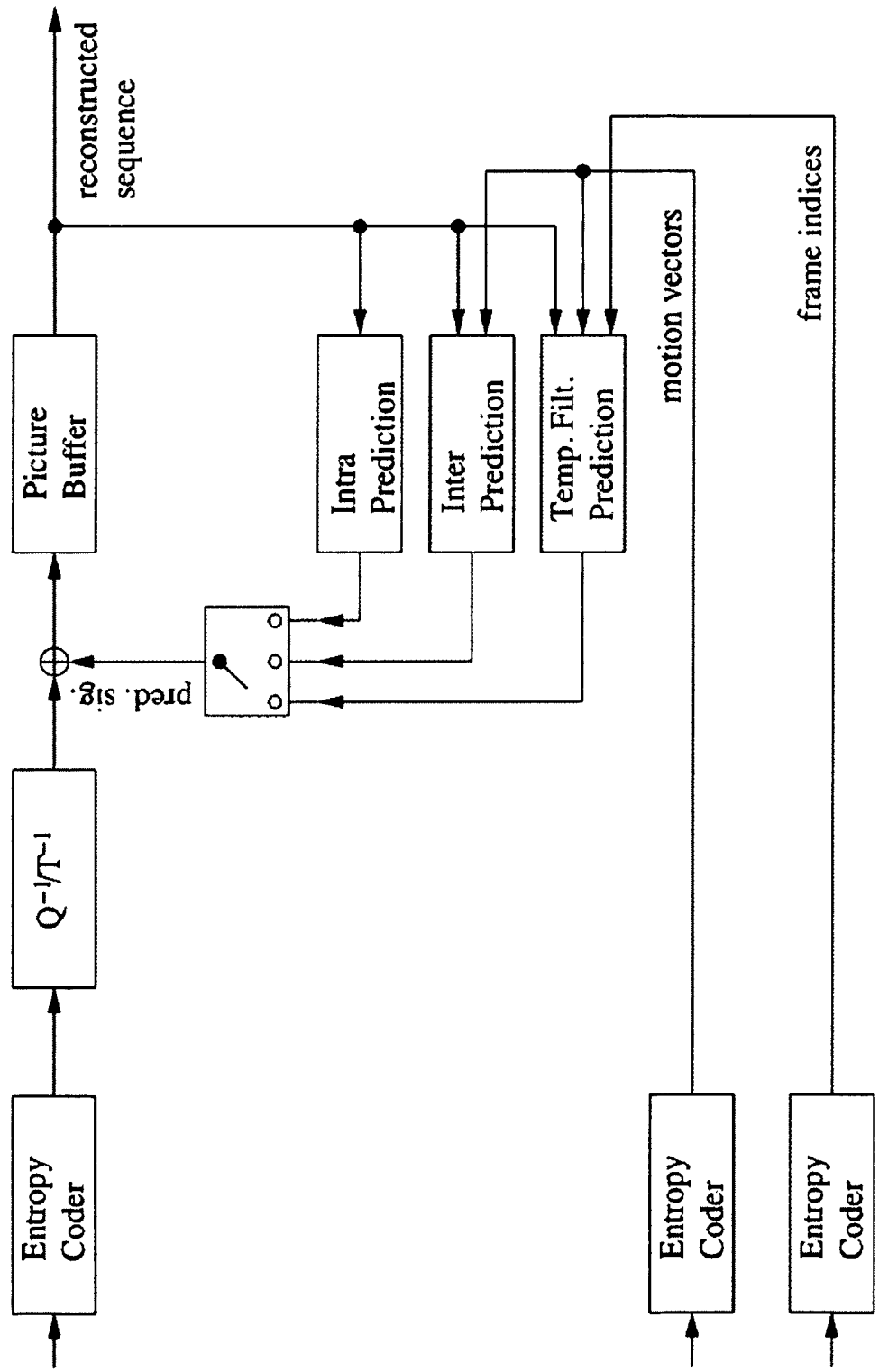

In a sixteenth preferred embodiment, temporal filtering inside the additional prediction mode is performed using the motion vector field provided by motion compensated prediction. This approach is depicted in FIG. 25. The encoder again decides what kind of prediction to choose for every region in a rate-distortion sense. Frame indices are transmitted as side information to the receiver for reproduction of prediction at the decoder. This embodiment can be extended to a multi-view coding scenario where the picture buffer is made up of spatially adjacent pictures from different views.

Combined Applications

Figure 26A:
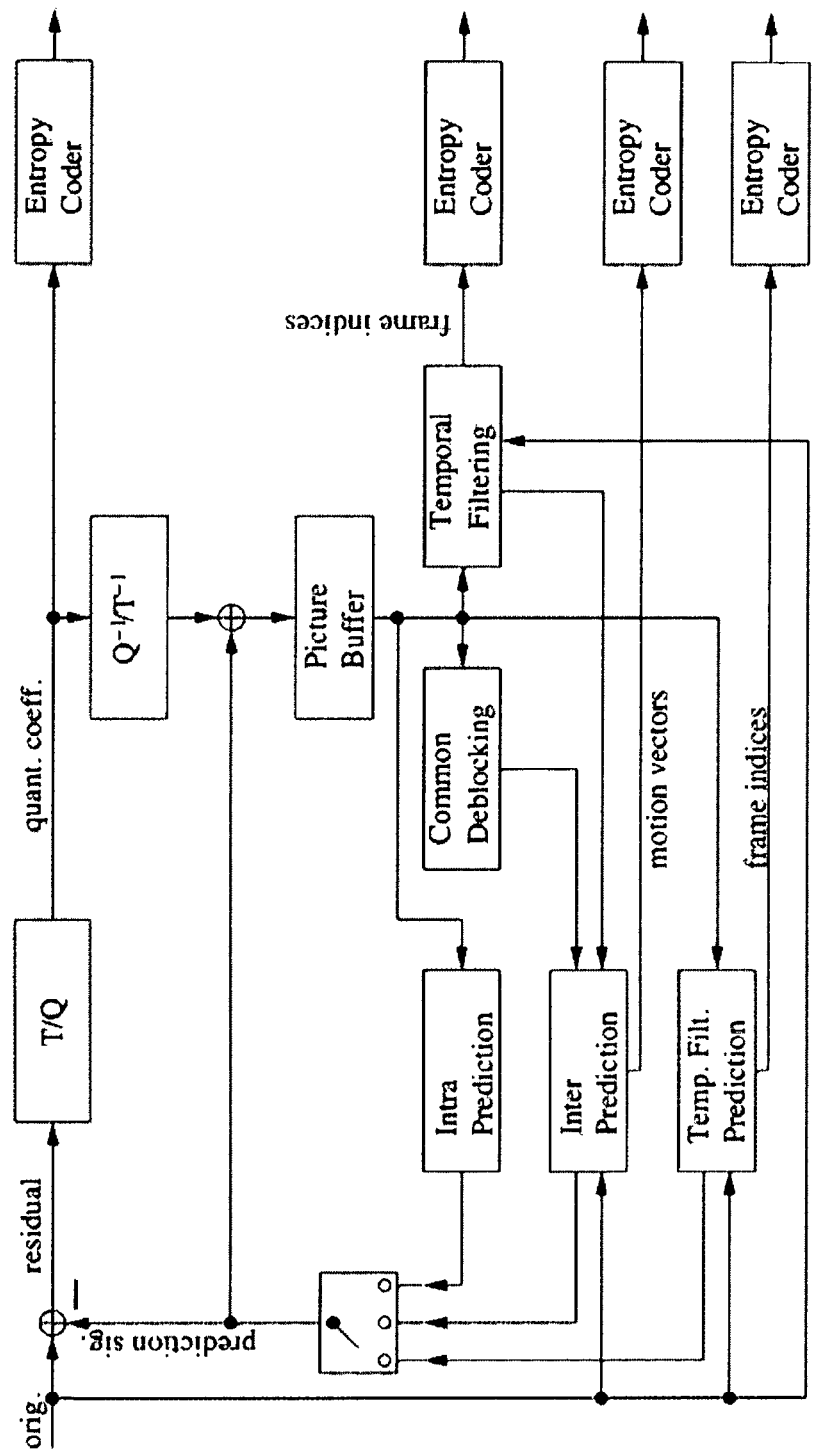
FIG. 26 shows in an exemplary fashion a temporal filtering incorporated into a common hybrid video coding environment as a combination of additional prediction mode and filtering for motion estimation enhancement, wherein a temporal filtering is performed using a pixel-based GME approach.
Figure 26B:
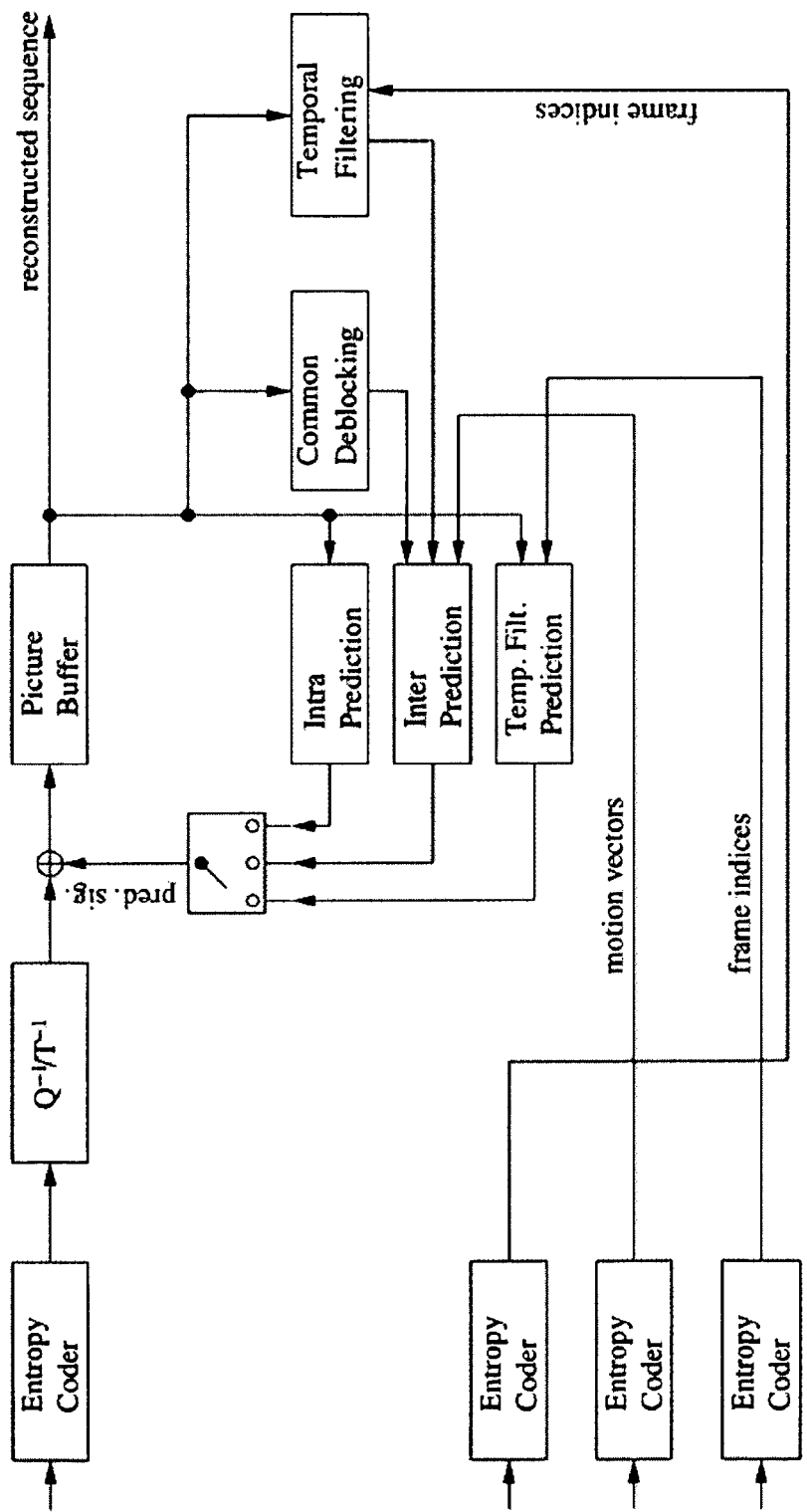

In a seventeenth preferred embodiment, temporal filtering is incorporated into a common hybrid video coding environment twofold. This embodiment is depicted as a block diagram in FIG. 26. Here, temporal filtering is on one hand performed as an additional prediction mode using the pictures available in the picture buffer. On the other hand, temporal filtering is done besides common deblocking for motion estimation enhancement. In that way, the encoder chooses the best possible prediction modes and filtering methods to reach the optimal rate-distortion. This embodiment can be extended to a multi-view coding scenario where the picture buffer is made up of spatially adjacent pictures from different views.

This embodiment serves only as an example for the possible combination of all previously described embodiments.

REFERENCES

1. T. Wiegand, G. J. Sullivan, G. Bjøntegaard, and A. Luthra, "*Overview of the H.264/AVC Video Coding Standard*", IEEE Transactions on Circuits and Systems for Video Technology, vol. 13, pp. 560-576, July 2003
2. P. List, A. Joch, J. Lainema, G. Bjøntegaard, and M. Karczewicz, "*Adaptive deblocking filter*", IEEE Transactions on Circuits and Systems for Video Technology, vol. 13, pp. 614-619, July 2003
3. H. Schwarz, D. Marpe, and T. Wiegand, "*Analysis of Hierarchical B Pictures and MCTF*", Proc. IEEE i Conference on Multimedia and Expo, July 2006, pp. 1929-1932
4. T. Wiegand, X. Zhang, and B. Girod, "*Long-Term Memory Motion-Compensated Prediction*", IEEE Transactions on Circuits and Systems for Video Technology, vol. 9, pp. 70-80, 1999
5. G. Sullivan, "*Multi-hypothesis motion compensation for low bit-rate video*", Proc. IEEE International Conference on Acoustics, Speech, and Signal Processing ICASSP-93, vol. 5, pp. 437-440, April 1993
6. T. Wiegand, E. Steinbach, and B. Girod, "*Affine Multi-picture Motion-Compensated Prediction*", IEEE Transactions on Circuits and Systems for Video Technology, vol. 15, pp. 197-209, February 2005
7. "*Coding of Audio-Visual Objects—Part 2: Visual*", MPEG-4 Visual Version 1, ISO/IEC14 496-2, 1999
8. A. Krutz, M. Frater, and T. Sikora, "*Improved image registration using the up-sampled domain*", International Conference on Multimedia Signal Processing (MMSP'06), Victoria, Canada, October 2006
9. F. Dufaux, and Janusz Konrad, "*Efficient, robust, and fast global motion estimation for video coding*", IEEE Transactions on Image Processing, vol. 9, pp. 497-501, 2000
10. S. Baker, and I. Matthews, "*Lucas-Kanade 20 years on: A unifying framework*", International Journal of Computer Vision, vol. 56, pp. 221-255, February 2004
11. A. Krutz, A. Glantz, T. Borgmann, M. Frater, and T. Sikora, "*Motion-Based Object Segmentation using Local Background Sprites*", Proceedings of the IEEE International Conference on Acoustics, Speech and Signal Processing (ICASSP 2009), Taipei, Taiwan, April 2009

The invention claimed is:

1. A method for processing an encoded video sequence, the method comprising:
reconstructing the encoded video sequence and providing a plurality of neighboring pictures;
transforming each of the neighboring pictures or at least a coherent region of each neighboring picture into a coordinate system of a reference picture based on a motion model, and thereby generating a picture stack comprising transformed pictures;
defining a plurality of picture stacks, each picture stack comprising an individual number of neighboring pictures relative to the reference picture;
for each picture stack, transforming each of the neighboring pictures or at least a coherent region of each neighboring picture into the coordinate system of the reference picture, based on a motion model, and thereby generating a stack of transformed pictures;
combining pixel amplitudes of corresponding pixels of the transformed pictures using a weighting function, to form a processed pixel amplitude for at least one image pixel of the reference picture;
generating a processed picture based on the processed pixel amplitude of the at least one image pixel;
assigning to each processed picture a length value defining its individual picture stack length;
generating for each processed picture a predicted picture which refers to the reference picture;
encoding the reference picture using the processed picture;
generating an encoded bit stream;
adding a value, which indicates the individual picture stack length of the picture used for encoding, to the encoded bit stream; and
encoding parameters for transforming each of the neighboring pictures or at least a coherent region of each neighboring picture into the coordinate system of a reference picture based on a motion model to the encoded bit stream.

2. The method according to claim 1 wherein the step of transforming neighboring pictures or at least a coherent region of each neighboring picture based on a motion model, and thereby generating a picture stack comprising transformed pictures, includes transforming prior and consecutive pictures, relative to the reference picture.

3. The method according to claim 1 wherein further video sequences having spatially adjacent pictures that comprise image pixels corresponding to those of the transformed pictures, are taken into account to form the processed pixel amplitude of the at least one image pixel.

4. The method according to claim 1 further characterized by at least two different process modes;
wherein, in each process mode, a maximum number of pictures is considered for generating the picture stack; and
wherein a flag is assigned which indicates the process mode that has been carried out in a bit stream.

5. The method according to claim 1,
wherein, in addition to the predicted pictures, an unfiltered predicted picture is generated by carrying out a prediction based on at least one picture preceding the reference picture;
wherein the predicted pictures and the unfiltered predicted picture are divided into blocks;

wherein each block of the reference picture is encoded based on the corresponding block of one of the predicted pictures or the corresponding block of the unfiltered predicted picture;

wherein, for each block, a flag is provided which indicates whether a block is encoded using one of the predicted pictures or the unfiltered predicted picture; and the flag is included into the encoded bit stream.

6. The method according to claim 1, wherein the motion model is a translational, affine, perspective or a parabolic motion model.

7. A decoder capable of carrying out the method according to claim 1.

8. An encoder capable of carrying out the method according to claim 1.

* * * * *